(12) United States Patent
Watson

(10) Patent No.: US 12,162,553 B2
(45) Date of Patent: Dec. 10, 2024

(54) DEVICE FOR ADJUSTING A SEAT POSITION OF A BICYCLE SEAT

(71) Applicant: David Watson, North Vancouver (CA)

(72) Inventor: David Watson, North Vancouver (CA)

(73) Assignee: David Watson, North Vancouver (CA)

( * ) Notice: Subject to any disclaimer, the term of this patent is extended or adjusted under 35 U.S.C. 154(b) by 1020 days.

(21) Appl. No.: 16/964,494

(22) PCT Filed: Jan. 31, 2019

(86) PCT No.: PCT/CA2019/050121
§ 371 (c)(1),
(2) Date: Jul. 23, 2020

(87) PCT Pub. No.: WO2019/148283
PCT Pub. Date: Aug. 8, 2019

(65) Prior Publication Data
US 2021/0031851 A1 Feb. 4, 2021

Related U.S. Application Data

(63) Continuation-in-part of application No. 15/885,405, filed on Jan. 31, 2018, now Pat. No. 10,450,022.

(51) Int. Cl.
*B62J 1/08* (2006.01)
*B62J 1/28* (2006.01)
(Continued)

(52) U.S. Cl.
CPC . *B62J 1/08* (2013.01); *B62J 1/28* (2013.01); *B62K 19/36* (2013.01); *B62K 23/02* (2013.01);
(Continued)

(58) Field of Classification Search
CPC .......... B62J 1/08; B62J 1/10; B62J 2001/085; B62K 23/02; A47C 3/20; A47C 7/008
See application file for complete search history.

(56) References Cited

U.S. PATENT DOCUMENTS

| | | | | |
|---|---|---|---|---|
| 4,108,462 A | * | 8/1978 | Martin | ....................... B62J 1/08 |
| | | | | 297/215.14 |
| 4,807,856 A | * | 2/1989 | Teckenbrock | ......... B62K 19/36 |
| | | | | 267/132 |

(Continued)

FOREIGN PATENT DOCUMENTS

| CA | 2881923 | 8/2016 |
|---|---|---|
| CN | 207072397 | 3/2018 |

(Continued)

OTHER PUBLICATIONS

Extended European Search Report, dated Aug. 23, 2021, received in EP Application No. 19748370.4.

(Continued)

*Primary Examiner* — Daniel J Wiley
(74) *Attorney, Agent, or Firm* — Davis Wright Tremaine LLP; Heather M. Colburn

(57) ABSTRACT

There is described a device for adjusting a seat position of a bicycle seat. The device allows a rider of a bicycle to adjust the tilt of their bicycle seat while the bicycle is in motion, without the rider having to first dismount. In some embodiments, the rider may also adjust the height of their bicycle seat at substantially the same time as the seat's tilt is an adjusted, again without the rider having to first dismount. There are described a motorized embodiment in which one or more motors are used to drive a tilt actuator and a linear actuator, and a mechanized embodiment in which a source of pressurized air may be used to drive the linear actuator which in turn drives the tilt actuator.

22 Claims, 9 Drawing Sheets

(51) Int. Cl.
  *B62K 19/36* (2006.01)
  *B62K 23/02* (2006.01)
  *F15B 1/26* (2006.01)
  *F15B 15/14* (2006.01)
  *F15B 15/20* (2006.01)
  *F16H 25/22* (2006.01)
  *B62J 45/00* (2020.01)

(52) U.S. Cl.
  CPC .............. *F15B 1/265* (2013.01); *F15B 15/14* (2013.01); *F15B 15/202* (2013.01); *F16H 25/2204* (2013.01); *B62J 2001/085* (2013.01); *B62J 45/00* (2020.02)

(56) References Cited

U.S. PATENT DOCUMENTS

| | | | |
|---|---|---|---|
| 5,007,675 A * | 4/1991 | Musto | B62K 19/36 297/215.14 |
| 5,048,891 A * | 9/1991 | Yach | B62J 1/065 297/215.14 |
| 5,149,034 A * | 9/1992 | Ganaja | B62K 19/36 280/281.1 |
| 5,295,727 A * | 3/1994 | Kao | B62J 1/08 297/215.14 |
| 5,441,327 A * | 8/1995 | Sanderson | B62J 1/08 297/215.15 |
| 5,489,139 A * | 2/1996 | McFarland | B62J 1/04 280/283 |
| 5,915,784 A * | 6/1999 | Clark | B62J 1/08 297/215.15 |
| 5,921,625 A * | 7/1999 | Muser | B62J 1/00 403/53 |
| 6,050,585 A | 4/2000 | Rai | |
| 6,174,027 B1 * | 1/2001 | Lemmens | B62K 19/36 297/215.14 |
| 6,202,971 B1 | 3/2001 | Duncan | |
| 6,290,291 B1 * | 9/2001 | Kojima | B62J 1/10 297/452.4 |
| 6,702,376 B1 | 3/2004 | Shen | |
| 7,083,180 B2 | 8/2006 | Turner | |
| 7,261,310 B2 | 8/2007 | Yifrah et al. | |
| 7,306,206 B2 | 12/2007 | Turner et al. | |
| 7,422,224 B2 | 9/2008 | Sicz et al. | |
| 7,527,581 B1 | 5/2009 | Verost | |
| 7,559,603 B1 * | 7/2009 | Chiang | B62J 1/08 297/215.14 |
| 7,651,162 B2 | 1/2010 | Segato | |
| 8,002,347 B2 * | 8/2011 | Geyer | B62K 19/36 297/195.1 |
| 8,091,910 B2 | 1/2012 | Hara et al. | |
| 8,136,877 B2 | 3/2012 | Walsh | |
| 8,454,086 B2 * | 6/2013 | Kim | B62K 19/36 297/215.15 |
| 8,668,259 B2 * | 3/2014 | Ulrich | B62J 1/00 297/215.15 |
| 8,727,436 B2 | 5/2014 | Connors | |
| 8,744,699 B2 | 6/2014 | Yamaguchi et al. | |
| 8,781,690 B2 | 7/2014 | Hara et al. | |
| 8,825,322 B1 | 9/2014 | Ikemoto et al. | |
| 8,833,786 B2 | 11/2014 | Bailly et al. | |
| 8,899,676 B2 | 12/2014 | Sajonia | |
| 8,911,012 B2 | 12/2014 | Choi | |
| 9,022,449 B2 | 5/2015 | Ishige | |
| 9,371,102 B1 | 6/2016 | Botkin | |
| 9,422,018 B2 | 8/2016 | Pelot et al. | |
| 9,446,807 B2 | 9/2016 | Nelson | |
| 9,481,420 B2 * | 11/2016 | McAndrews | B62J 1/08 |
| 9,511,809 B2 | 12/2016 | Kodama et al. | |
| 9,540,067 B2 | 1/2017 | Chen et al. | |
| 9,573,640 B2 * | 2/2017 | Kim | B62J 1/10 |
| 9,573,643 B1 * | 2/2017 | Schwary | B62J 1/08 |
| 9,580,123 B2 | 2/2017 | Shirai | |
| 9,580,124 B2 | 2/2017 | Shirai | |
| 9,592,882 B2 | 3/2017 | Butora et al. | |
| 9,616,953 B2 | 4/2017 | Tsai | |
| 9,616,954 B2 * | 4/2017 | McPherson | B62J 1/08 |
| 9,688,331 B1 * | 6/2017 | Shirai | B62J 1/08 |
| 9,694,865 B2 | 7/2017 | McAndrews et al. | |
| 9,783,252 B2 | 10/2017 | Kim | |
| 9,783,254 B2 | 10/2017 | Li | |
| 9,840,305 B1 | 12/2017 | Tsuchizawa et al. | |
| 9,889,898 B1 | 2/2018 | Marui | |
| 9,944,337 B2 | 4/2018 | McAndrews et al. | |
| 9,969,447 B2 | 5/2018 | Shirai | |
| 9,969,448 B1 | 5/2018 | Chen | |
| 10,023,139 B2 | 7/2018 | Watarai et al. | |
| 10,081,405 B2 | 9/2018 | McAndrews et al. | |
| 10,086,892 B2 | 10/2018 | Laird et al. | |
| 10,093,374 B2 | 10/2018 | Mcpherson et al. | |
| 10,106,216 B2 | 10/2018 | Shirai | |
| 10,246,154 B2 | 4/2019 | Eldredge | |
| 10,259,520 B2 | 4/2019 | Butora et al. | |
| 10,358,180 B2 | 7/2019 | Shipman et al. | |
| 10,392,065 B2 | 8/2019 | Shenkerman | |
| 10,399,625 B2 | 9/2019 | Hwang | |
| 10,450,020 B2 | 10/2019 | Shankman | |
| 10,472,012 B2 | 11/2019 | Shirai | |
| 10,710,662 B2 | 7/2020 | Bowers et al. | |
| 10,869,794 B2 | 12/2020 | Lindquist et al. | |
| 11,136,083 B2 | 10/2021 | Shirai | |
| 11,161,565 B2 | 10/2021 | Kurotobi | |
| 11,649,002 B2 | 5/2023 | Shipman | |
| 2005/0200170 A1 * | 9/2005 | Liao | B62J 1/08 297/215.15 |
| 2007/0262623 A1 * | 11/2007 | Fortt | B62J 1/08 297/215.13 |
| 2007/0286671 A1 | 12/2007 | Meggiolan | |
| 2011/0204201 A1 | 8/2011 | Kodama et al. | |
| 2011/0254328 A1 * | 10/2011 | Sloan | B62J 1/08 297/215.14 |
| 2015/0034779 A1 * | 2/2015 | McAndrews | B62J 1/08 248/125.8 |
| 2015/0197308 A1 | 7/2015 | Butora et al. | |
| 2015/0239516 A1 * | 8/2015 | Nelson | B62J 1/08 297/215.15 |
| 2016/0059919 A1 | 3/2016 | Kim | |
| 2016/0075389 A1 * | 3/2016 | Ahnert | F16C 11/04 403/54 |
| 2016/0176463 A1 * | 6/2016 | McPherson | B62J 1/08 297/215.15 |
| 2016/0311485 A1 * | 10/2016 | D'Aluisio | B62J 1/04 |
| 2017/0225732 A1 * | 8/2017 | Hsu | B62J 1/08 |
| 2017/0341705 A1 * | 11/2017 | Tsuchizawa | B62M 6/55 |
| 2018/0229790 A1 | 8/2018 | McAndrews et al. | |
| 2018/0334212 A1 * | 11/2018 | Bowers | B62K 3/02 |
| 2019/0061851 A1 * | 2/2019 | Kurokawa | B62J 1/08 |
| 2019/0233041 A1 | 8/2019 | Watson | |
| 2019/0291813 A1 | 9/2019 | Tsuchizawa | |
| 2020/0130777 A1 | 4/2020 | Yamazaki et al. | |
| 2021/0107588 A1 | 4/2021 | Ward et al. | |
| 2021/0179227 A1 | 6/2021 | Sintorn | |

FOREIGN PATENT DOCUMENTS

| | | |
|---|---|---|
| DE | 20 2015 102757 | 6/2015 |
| EP | 2 514 659 | 10/2012 |
| EP | 3 233 616 | 10/2017 |
| EP | 2977302 | 1/2018 |
| EP | 2927517 | 6/2018 |
| EP | 2979625 | 6/2018 |
| GB | 2529305 | 2/2016 |
| JP | 2011011608 | 1/2011 |
| JP | 2016068646 | 5/2016 |
| WO | 2010/137608 | 12/2010 |
| WO | 2016/100572 | 6/2016 |

OTHER PUBLICATIONS

International Search Report an Written Opinion, dated Aug. 5, 2021, received in International Application No. PCT/CA2021/050623.

(56) References Cited

OTHER PUBLICATIONS www.magura.com/en/bike/products/katalog/produkte/detail/79-2014/gravity-series/allgemein/vyron-seatpost-2/allgemein.html, published Mar. 26, 2016.
http://raceface.com/components/saddle-seatposts/turbine/turbine-dropper-seatpost/, published Feb. 16, 2016.
www.raceface.com/products/details/turbine-dropper-seatposts, published Apr. 18, 2016.
www.ridefox.com/2016/product.php?m=bike&t=seatpost, published Mar. 25, 2016.
www.sram.com/rockshox/products/reverb, published online Jan. 31, 2016.
International Search Report and Written Opinion, dated Apr. 11, 2019, received in International Application No. PCT/CA2019/050121.
Extended European Search Report, dated Apr. 4, 2024, received in European Patent Application No. 21800207.9.
https://en.wikipedia.org/wiki/Inertial_measurement_unit (retrieved Jan. 10, 2020).
Non-Final Office Action, dated Sep. 25, 2024, received in U.S. Appl. No. 17/923,201.

\* cited by examiner

DEVICE FOR ADJUSTING A SEAT POSITION OF A BICYCLE SEAT

CROSS-REFERENCE TO RELATED APPLICATIONS

The present application is a U.S. National Stage entry under 35 U.S.C. § 371 of International Patent Application No. PCT/CA2019/050121, filed on Jan. 31, 2019, designating the United States of America and published in English on Aug. 8, 2019, which in turn is a continuation-in-part of U.S. patent application Ser. No. 15/885,405, filed on Jan. 31, 2018, each of which is hereby incorporated herein by reference in its entirety.

FIELD OF THE DISCLOSURE

The present disclosure relates to a device for adjusting a seat position of a bicycle seat.

BACKGROUND TO THE DISCLOSURE

It is important for riders of bicycles to be properly positioned on their bike when cycling. Poor positioning of the rider can lead not only to decreased performance but in some cases may also lead to the development of muscular aches and pains.

One of the principal ways in which a rider can adjust their position on a bicycle is by adjusting the position of their seat (also generally referred to as a saddle). It is a known industry fact that the rider's performance is greatly enhanced if the saddle height is located closest to the optimum saddle height. The optimum saddle height is generally a function of the steepness of the surface on which the rider is cycling. Typically a rider will want a lower saddle position for descending, a mid-level saddle position for side hilling, and a raised saddle position for ascending. For example, while descending, if the saddle is in a lowered position the rider is able to move their center of gravity back over the rear wheel, to increase control and fluidity, as well as be less likely to fall forward or be thrown over the handlebars. Thus, they can descend faster and with better precision. Similarly, while ascending or climbing, if the saddle is in a raised position then the rider will now be in an extended leg position. As a result the rider will be able to get their center of gravity over parts of the rear wheel, increasing power output, control and ascending traction, as well as being less likely to fall to either side or put a foot down. Thus, they can climb faster, with less fatigue, and with improved performance and better precision.

To adjust a saddle's vertical position relative to the bicycle frame, most bicycles have a seat post that is adjustable in height. The seat post is inserted into a bicycle's seat tube to an extent that provides the desired seat height, and the seat post is subsequently clamped to the seat tube. When desiring to adjust the seat height during a ride, a rider will typically dismount, loosen the clamp, adjust the vertical position of the saddle by moving the seat post up or down, as required, and then tighten the clamp to re-engage the seat post to the seat tube.

However, manually adjusting the seat height as described above is clearly time-consuming. For example, if during a session a rider is faced with a long uphill stretch and wishes to raise the saddle, they must first dismount, make the necessary adjustment and then mount again, losing time as well as expending energy. To avoid the need to make saddle adjustments every time the steepness of the surface changes dramatically, a rider will often simply opt for a 'middle of a the road' saddle height, and as a result will compromise by having the saddle too high for downhill sections, and too low for uphill sections.

Developments in the cycling industry have led to the invention of automatic saddle height adjustment mechanisms, such as those described in U.S. Pat. Nos. 6,202,971 and 7,083,180. For example, U.S. Pat. No. 6,202,971 describes seat posts that may be adjusted in height while the bicycle is in motion. Despite the introduction of 'in situ' saddle height adjustment mechanisms, there remains a need in the art to allow riders to further adjust the position of their bicycle seat while riding a bicycle. The present disclosure seeks to provide a device that addresses this need.

SUMMARY OF THE DISCLOSURE

While seat height is an important factor in obtaining a rider's optimal riding position, it is not the only factor. Another important parameter is seat tilt. The tilt of the seat may be considered as the angle defined by the bicycle's seat/saddle and the surface on which the bicycle is moving. In the prior art, similarly to manually adjustable seat posts, seat tilt is adjustable, when off the bike, by disengaging a locking clamp, adjusting the tilt angle of the saddle, and re-engaging the clamp. Much like manually height-adjustable seat posts, modifying the tilt of the seat in such a fashion is time-consuming and with current bicycle systems cannot be executed while the bicycle is in motion.

At present a rider generally pre-sets the saddle tilt prior to riding, and during riding accepts that for certain uphill/downhill sections the seat tilt angle will not be optimal as it cannot be adjusted without dismounting the bike. Typically, the optimum tilt angle range for ascending based on rider preference is between +5° and −5°. When ascending, there is therefore a variance of approximately 10° in seat tilt between different riders. When descending, there is typically a variance of approximately 15° in seat tilt between different riders (rider preference when descending is typically between +25° and +10°). Therefore there generally exists a total variance of roughly 30° in tilt angle between riders, when descending and ascending. It would be clearly advantageous, therefore, if a device were provided that could address seat tilt without the need for a rider to dismount their bike and manually adjust the tilt of their saddle.

The present disclosure provides a device that may allow for automatic adjustment of the seat tilt of a bicycle during riding of the bicycle (i.e. when the bicycle is in motion). The device may furthermore allow for automatic adjustment of seat height, substantially at the same time that seat tilt is being adjusted. Riders may automatically position themselves in the anatomically correct expert position via a seat post that may be automatically adjustable in height in combination with a seat whose tilt may be automatically adjusted, while the bicycle is in motion. The controller for actuating the seat height and seat tilt adjustments may be within easy reach of the rider (for example the controller may be located on a handlebar of the bike).

In accordance with an aspect of the disclosure, there is provide a device for adjusting a seat position of a bicycle seat. The device comprises a seat tube coupling configured to couple to a bicycle seat tube; a seat coupling configured to couple to a bicycle seat; and a seat adjustment mechanism movably coupling the seat tube coupling and the seat coupling. The seat adjustment mechanism comprises a tilt actuator operable to adjust a tilt of the seat coupling relative to the seat tube coupling. The device further comprises a tilt controller remote from and communicative with the seat adjustment mechanism and operable by a rider of a bicycle to actuate the tilt actuator thereby adjusting the tilt of the seat coupling relative to the seat tube coupling.

Thus, a rider may adjust their seat tilt while riding the bike, without the need to dismount. Riders may therefore be able to achieve better control, style, and riding technique, while also increasing safety and enjoyment, without expending significant time and energy dismounting and manually adjusting seat tilt, as in the prior art. Riders may furthermore no longer have to compromise with seat tilt set to 'middle of the road' settings and may enjoy the benefit of an optimum seat tilt simply by actuating the seat adjustment mechanism.

The seat adjustment mechanism may be arranged to provide tilting of the seat coupling relative to the seat tube coupling. The seat coupling may be any mechanical coupling configured to couple to or engage with a bicycle seat. The seat tube coupling may be any mechanical coupling configured to couple to or engage with a seat tube of a bicycle. For example, the seat tube coupling may comprise a seat post arranged to be received within a bicycle seat tube. The tilt actuator may be arranged when actuated to cause tilting of the seat coupling along an axis, thereby causing corresponding tilting of a bicycle seat attached to the seat coupling. The tilt controller may be electrically, mechanically, or hydraulically communicative with the seat adjustment mechanism. Other forms of communication are envisaged between the tilt controller and the seat adjustment mechanism. The tilt controller is actuable by a rider when the bicycle is in motion. For example, the tilt controller may take the form of a lever, button or the like, and may be positioned on the handlebars of the bicycle, and the rider may use their thumb or another digit to activate the tilt controller. The tilt controller may be located at other points on the bicycle, provided that they may be relatively easily accessed by the rider during riding of the bicycle.

The tilt actuator may comprise a seat coupling gear fixed to the seat coupling. The seat adjustment mechanism may further comprise a prime mover rotatably coupled to the seat coupling gear along a tilt axis such that movement of the prime mover rotates the seat coupling gear thereby adjusting the tilt of the seat coupling along the tilt axis.

The prime mover may comprise an electrical motor or a source of pressurized air. Actuation of the tilt controller may cause operation of the electrical motor, or may cause release of the pressurized air.

The prime mover may comprise a rotatable upper shaft comprising a drive gear. The tilt axis and upper shaft may be perpendicular to each other, and the drive gear and seat coupling gear may be bevelled and coupled to each other such that rotation of the upper shaft causes rotation of the seat coupling gear.

The seat adjustment mechanism may further comprise a linear actuator operable to linearly translate the seat tube coupling relative to the seat coupling. The seat adjustment mechanism may further comprise a height controller remote from and communicative with the seat adjustment mechanism and operable by the rider to actuate the linear actuator thereby adjusting the height of the seat coupling relative to the seat tube coupling.

The rider may therefore, using the height controller, actuate the linear actuator to adjust a height of the bicycle seat 'on the fly' (i.e. while the bicycle is in motion). The linear actuator may comprise a shaft, such as a ball screw, threadedly engaged with a seat post. For example the ball screw may be threadedly engaged with a ball nut fixed to the seat post. Operation of the height controller may provide height adjustment of the seat coupling relative to the seat tube coupling. The height adjustment may comprise telescoping or translating of one or more seat posts relative to one or more further seat posts.

The height controller may be electrically, mechanically, or hydraulically communicative with the seat adjustment mechanism. The height controller may be actuable by a rider when the bicycle is in motion. For example, the height controller may take the form of a lever, button or the like, and may be positioned on the handlebars of the bicycle, and the rider may use their thumb or another digit to activate the height controller.

The tilt controller and/or height controller could be buttons, paddles, levers, or similar, and may be designed with different heights from the assembly that houses them. A rider may therefore not need to look at the controllers when riding, as the controllers may be operated by touch rather than necessarily by sight. In some embodiments, the rider may operate the controllers through other means, such as by voice command, or via a heads-up display. In still other embodiments, the controllers may be configured to activate according to autonomous pre-sets.

The seat adjustment mechanism may further comprise a lower post coupled to the seat tube coupling and defining a translation axis; and an upper post coupled to the seat coupling and translatable relative to the lower post along the translation axis. The prime mover may be coupled to the linear actuator. The linear actuator may be coupled to the lower post and upper post and actuable by the prime mover to linearly translate the lower post relative to the upper post.

Thus, the tilt actuator may translate relative to the lower post during telescoping/translating of the upper post relative to the lower post.

The prime mover may comprise at least one electrical motor having a first drive shaft rotatably coupled to the seat coupling gear. The tilt controller may be communicative with the at least one electrical motor.

The rider may therefore, using the tilt controller, actuate the electrical motor to operate the tilt actuator, thereby adjusting a tilt of the bicycle seat 'on the fly' (i.e. while the bicycle is in motion), via tilting of the seat coupling relative to the seat tube coupling. The electrical motor may be arranged to simultaneously operate both tilting and translation of the seat coupling relative to the seat tube coupling. Alternatively, the motor may be arranged to operate tilting of the seat coupling relative to the seat tube coupling independently of translation of the seat coupling relative to the seat tube coupling.

The linear actuator may comprise a threaded lower shaft in rotatable threaded engagement with one of the upper post and the lower post. The at least one electrical motor may be fixed to the other one of the upper post and lower post. The at least one electrical motor may comprise a second drive shaft coupled to the threaded lower shaft and operable to rotate the threaded lower shaft thereby causing the upper post to translate relative to the lower post.

Through the threaded engagement of the threaded lower shaft with one of the upper post and the lower post, rotation of the threaded lower shaft may be arranged to cause the post to which the lower shaft is threadedly coupled to translate relative to the threaded lower shaft. The other of the upper and lower posts may translate with the threaded lower shaft as the threaded lower shaft is rotated.

The linear actuator may further comprise a threaded ball nut fixed to the one of the lower post and the upper post. The threaded lower shaft may be a threaded ball screw rotatably engaging the threaded ball nut.

More generally, the linear actuator may comprise any other suitable linear motion assembly configured to convert motion of the second drive shaft of the at least one electrical motor into corresponding linear motion of the upper post relative to the lower post. For example, the linear actuator may comprise any other suitable linear actuator such as an offset linear actuator or a direct drive linear actuator. Such linear actuators may include tooth belts, rails, rods, or block and tackle configurations. Furthermore, in the above-described embodiments, instead of a threaded ball nut, a roller nut may be used, and, instead of a threaded ball screw, a roller screw may be used. An arbor may also be used. The arbor may be used with a sleeve in a chuck-like assembly to couple to the linear actuator. The arbor may facilitate modification of the thread grade, tooth grade, etc., of the linear actuator.

The tilt controller may comprise a tilt control interface mountable to a portion, such as a handlebar, of the bicycle, such that the tilt control interface may be operable by the rider to actuate the tilt actuator when the bicycle is in motion. In some embodiments, the tilt control interface may be mountable to the rider.

The height controller may comprise a height control interface mountable to a portion, such as a handlebar, of the bicycle, such that the height control interface may be operable by the rider to actuate the linear actuator when the bicycle is in motion. In some embodiments, the height control interface may be mountable to the rider.

One controller (tilt or height) may be operated independently of the other (height or tilt, respectively). In the one embodiment, this may be achieved for example by providing two motors: one to control height and the other to control tilt. Alternatively, one motor with two independently controllable outputs may be used.

The tilt controller and the height controller may be integrated and may comprise a combined tilt and height control interface mountable to a portion, such as a handlebar, of the bicycle and which is operable by the rider to substantially simultaneously actuate the tilt actuator and the linear actuator when the bicycle is in motion. In some embodiments, the combined tilt and height control interface may be mountable to the rider. Thus, actuation of the tilt and height controllers (integrated in the combined tilt and height control interface) may cause substantial simultaneous actuation of both the tilt actuator and the linear actuator. This may result in both adjustment of a bicycle seat tilt and a bicycle seat height. In particular, raising of the saddle height may result in corresponding downward tilting of the saddle. Similarly, lowering of the saddle height may result in corresponding upward tilting of the saddle. The ratio of height adjustment to tilt adjustment may be pre-set during manufacture of the device, and may be adjustable by a user.

The prime mover may comprise at least one electrical motor which drives the first and second drive shafts. The combined tilt and height control interface may be communicative with the at least one electrical motor.

The prime mover may comprise a pressurized air chamber mounted in the lower post. The linear actuator may comprise a piston assembly with a piston chamber in the lower post fluidly coupled to the pressurized air chamber via an air valve. The linear actuator may further comprise a piston fixed to the upper post and movable within the lower post along the translation axis. The height controller may be further communicative with the air valve and operable to open the air valve to enable air to pass between the pressurized air chamber and the piston thereby linearly translating the upper post relative to the lower post.

The rotatable upper shaft may be fixed to the upper post along the translation axis. The rotatable upper shaft may be in rotatable threaded engagement with the lower post, such that linear translation of the upper post relative to the lower post may cause the rotatable upper shaft to rotate.

The tilt actuator may further comprise a gear reduction unit rotatably coupling the rotatable upper shaft to the seat coupling gear. The gear reduction unit may be coupled to the rotatable upper shaft, such that rotation of the rotatable upper shaft may provide an input to the gear reduction unit which, as an output, provides a reduced rotation of the seat coupling gear.

The device may further comprise a resilient bias (such as a compression spring) arranged to bias the upper post away from the lower post along the translation axis. The resilient bias may assist the upper post in translating relative to the lower post, thereby making it easier for the rider to raise the saddle when using a source of pressurized air (as opposed to a motor) to adjust the height of the bicycle seat. Additionally, the resilient bias may provide a dampening force to control the descent of the upper post relative to the lower post when the rider wishes to lower the saddle.

The device may further comprise a height sensor arranged to determine a height of the seat coupling relative to the seat tube coupling. The device may further comprise a tilt sensor arranged to determine a tilt of the seat coupling relative to the seat tube coupling. The device may further comprise a control unit communicative with the height sensor and the tilt sensor. The control unit may be arranged, based on one of the determined height and tilt of the seat coupling relative to the seat tube coupling, to actuate one of tilt actuator and the linear actuator, respectively.

The height sensor may be any sensor configured to detect a change in height of the seat coupling relative to the seat tube coupling. For example, the height sensor may be positioned and arranged to detect a degree of translation or telescoping of one tube or post of the device relative to another tube or post of the device. The tilt sensor may be any sensor configured to detect a change in the angle of tilt of the seat coupling relative to the seat tube coupling. For example, the tilt sensor may be positioned and arranged to detect a degree of rotation of a gear relative to a reference point.

According to a further aspect of the disclosure, there is provided a device for adjusting a seat position of a bicycle seat. The device comprises a seat tube coupling configured to couple to a bicycle seat tube; a seat coupling configured to couple to a bicycle seat; and a seat adjustment mechanism comprising a tilt actuator operable to adjust, about a tilt axis, a tilt of the seat coupling relative to the seat tube coupling. The tilt actuator comprises a seat coupling gear fixed to the seat coupling. The seat adjustment mechanism further comprises a prime mover movably coupled to the seat coupling gear such that movement of the prime mover causes rotation of the seat coupling gear thereby adjusting the tilt of the seat coupling about the tilt axis. The device further comprises a tilt controller remote from and communicative with the seat adjustment mechanism and operable by a rider of a bicycle to actuate the tilt actuator thereby adjusting the tilt of the seat coupling relative to the seat tube coupling.

The prime mover may comprise a rotatable upper shaft comprising a drive gear. The tilt axis and upper shaft may be perpendicular to each other. The drive gear and seat coupling gear may be coupled to each other such that rotation of the upper shaft causes rotation of the seat coupling gear.

The drive gear and seat coupling gear may be bevelled, toothed, or may incorporate one or more bearings, such as ½ moon, sealed, or needle bearings.

The seat adjustment mechanism may further comprise a linear actuator operable to linearly translate the seat tube coupling relative to the seat coupling. The device may further comprise a height controller remote from and communicative with the seat adjustment mechanism and operable by the rider to actuate the linear actuator thereby adjusting the height of the seat coupling relative to the seat tube coupling.

The seat adjustment mechanism may further comprise: a lower post coupled to the seat tube coupling and defining a translation axis; and an upper post coupled to the seat coupling and translatable relative to the lower post along the translation axis. The prime mover may be coupled to the linear actuator, the linear actuator may be coupled to the lower post and upper post, and the linear actuator may be actuable by the prime mover to linearly translate the lower post relative to the upper post.

The prime mover may comprise at least one motor having a first drive shaft movably coupled to the seat coupling gear. The tilt controller may be communicative with the at least one motor.

The seat adjustment mechanism may further comprise a linear actuator operable to linearly translate the seat tube coupling relative to the seat coupling. The device may further comprise a height controller remote from and communicative with the seat adjustment mechanism and operable by the rider to actuate the linear actuator thereby adjusting the height of the seat coupling relative to the seat tube coupling.

The at least one motor may be fixed to one of the upper post and the lower post and may comprise a second drive shaft movably coupled to the linear actuator and operable to actuate the linear actuator and thereby cause linear translation of the upper post relative to the lower post.

The linear actuator may comprise a threaded or toothed lower shaft in rotatable threaded or toothed engagement with the other of the upper post and the lower post. The second drive shaft may be further operable to rotate the threaded or toothed lower shaft and thereby cause the upper post to translate relative to the lower post.

The linear actuator may further comprise a threaded ball nut fixed to the other of the lower post and the upper post. The threaded lower shaft may comprise a threaded ball screw rotatably engaging the threaded ball nut.

The linear actuator may comprise a roller nut fixed to the other of the lower post and the upper post, and the toothed lower shaft may comprise a roller screw rotatably engaging the roller nut.

The tilt controller may comprise a tilt control interface operable by the rider to actuate the tilt actuator when the bicycle is in motion.

The height controller may comprise a height control interface operable by the rider to actuate the linear actuator when the bicycle is in motion.

The tilt controller and the height controller may be integrated and may comprise a combined tilt and height control interface operable by the rider to actuate the tilt actuator and the linear actuator when the bicycle is in motion.

The prime mover may comprise a pressurized air chamber mounted in the lower post, the linear actuator may comprise a piston assembly with a piston chamber in the lower post fluidly coupled to the pressurized air chamber via an air valve, and a piston may be fixed to the upper post and movable within the lower post along the translation axis. The height controller may be further communicative with the air valve and operable to open the air valve to enable air to pass between the pressurized air chamber and the piston to thereby cause the upper post to translate linearly relative to the lower post.

The prime mover may further comprise a rotatable upper shaft comprising a drive gear. The tilt axis and upper shaft may be perpendicular to each other. The drive gear and seat coupling gear may be coupled to each other such that rotation of the upper shaft causes rotation of the seat coupling gear. The rotatable upper shaft may be fixed to the upper post along the translation axis and in rotatable engagement with the lower post, such that linear translation of the upper post relative to the lower post may cause the rotatable upper shaft to rotate.

The tilt actuator may further comprise a gear reduction unit rotatably coupling the rotatable upper shaft to the seat coupling gear.

The device may further comprise a resilient bias arranged to bias the upper post away from the lower post along the translation axis. The resilient bias may comprise a compression spring.

The device may further comprise a gear adjustment unit for adjusting an output of the first drive shaft relative to the second drive shaft.

The at least one motor may comprise a first motor movably coupled to the seat coupling gear, and a second motor movably coupled to the linear actuator.

The device may further comprise: a height sensor arranged to determine a height of the seat coupling relative to the seat tube coupling; a tilt sensor arranged to determine a tilt of the seat coupling relative to the seat tube coupling; and a control unit communicative with the height sensor and the tilt sensor and arranged, based on the determined height and tilt of the seat coupling relative to the seat tube coupling, to actuate one or more of the tilt actuator and the linear actuator. Actuating the tilt actuator may cause the first motor to be operated, and actuating the linear actuator may cause the second motor to be operated.

The control unit may be operable to cause the first motor to operate in response to operation of the second motor having caused the seat coupling to translate relative to the seat tube coupling. The control unit may be operable to cause the second motor to operate in response to operation of the first motor having caused the seat coupling to tilt relative to the seat tube coupling.

The device may further comprise a gear adjustment unit coupled to one or more of the first motor and the second motor. The gear adjustment unit may be configured to adjust an output of one or more of the first motor and the second motor.

The at least one motor may comprise at least one linear motor. The at least one linear motor may be coupled to a linear-rotary converter operable to convert a linear output of the at least one linear motor into torque for driving the seat coupling gear.

According to a further aspect of the disclosure, there is provided a device for adjusting a seat position of a bicycle seat, the device comprising: a seat tube coupling configured to couple to a bicycle seat tube; a seat coupling configured to couple to a bicycle seat; a seat adjustment mechanism comprising: a tilt actuator operable to adjust, about a tilt axis, a tilt of the seat coupling relative to the seat tube coupling; a linear actuator operable to linearly translate the seat tube coupling relative to the seat coupling; and a prime mover comprising at least one motor: movably coupled to the tilt actuator and operable to actuate the tilt actuator and thereby adjust, about the tilt axis, the tilt of the seat coupling relative to the seat tube coupling; and movably coupled to the linear actuator and operable to actuate the linear actuator and thereby cause linear translation of the seat tube coupling relative to the seat coupling.

The device may further comprise a tilt controller remote from and communicative with the seat adjustment mechanism and operable by a rider of a bicycle to actuate the tilt actuator and thereby adjust the tilt of the seat coupling relative to the seat tube coupling.

The device may further comprise a height controller remote from and communicative with the seat adjustment mechanism and operable by a rider of a bicycle to actuate the linear actuator and thereby adjust the height of the seat coupling relative to the seat tube coupling.

The tilt actuator may comprise a seat coupling gear fixed to the seat coupling. The at least one motor may be operable to drive rotation of a drive gear rotatably coupled to the seat coupling gear, and thereby cause rotation of the seat coupling gear.

One or more of the drive gear and the seat coupling gear may be bevelled, toothed, or may comprise one or more bearings.

The seat adjustment mechanism may further comprise: a lower post coupled to the seat tube coupling and defining a translation axis; and an upper post coupled to the seat coupling and translatable relative to the lower post along the translation axis. The linear actuator may be coupled to the lower post and upper post, and the linear actuator may be actuable by the prime mover to linearly translate the lower post relative to the upper post.

The at least one motor may be operable to drive a drive shaft movably coupled to the tilt actuator.

The at least one motor may be operable to drive a drive shaft movably coupled to the linear actuator.

The at least one motor may be fixed to one of the upper post and the lower post and may be operable to actuate the linear actuator and thereby cause linear translation of the upper post relative to the lower post. The linear actuator may comprise a threaded or toothed lower shaft in rotatable threaded or toothed engagement with the other of the upper post and the lower post, and the at least one motor may be further operable to rotate the threaded or toothed lower shaft and thereby cause the upper post to translate relative to the lower post. The linear actuator may further comprise a threaded ball nut fixed to the other of the lower post and the upper post and wherein the threaded lower shaft comprises a threaded ball screw rotatably engaging the threaded ball nut; or the linear actuator may further comprise a roller nut fixed to the other of the lower post and the upper post and wherein the toothed lower shaft comprises a roller screw rotatably engaging the roller nut.

The tilt controller may comprise a tilt control interface operable by the rider to actuate the tilt actuator when the bicycle is in motion.

The height controller may comprise a height control interface operable by the rider to actuate the linear actuator when the bicycle is in motion.

The tilt controller and the height controller may be integrated and may comprise a combined tilt and height control interface operable by the rider to actuate the tilt actuator and the linear actuator when the bicycle is in motion.

The seat adjustment mechanism may further comprise a gear adjustment unit for adjusting an output of the drive shaft movably coupled to the tilt actuator relative to the drive shaft movably coupled to the linear actuator.

The at least one motor may comprise a first motor movably coupled to the tilt actuator, and a second motor movably coupled to the linear actuator.

The at least one motor may comprise a motor movably coupled to the tilt actuator and movably coupled to the linear actuator.

The device may further comprise: a height sensor configured to determine a height of the seat coupling relative to the seat tube coupling; a tilt sensor configured to determine a tilt of the seat coupling relative to the seat tube coupling; and a control unit communicative with the height sensor and the tilt sensor and configured, based on the determined height and tilt of the seat coupling relative to the seat tube coupling, to actuate one or more of the tilt actuator and the linear actuator. Actuating the tilt actuator may comprise driving the drive shaft movably coupled to the tilt actuator, and actuating the linear actuator may comprise driving the drive shaft movably coupled to the linear actuator.

The control unit may be further configured to: drive the drive shaft movably coupled to the tilt actuator in response to translation of the seat tube coupling relative to the seat coupling; or drive the drive shaft movably coupled to the linear actuator in response to tilting of the seat coupling relative to the seat tube coupling.

The at least one motor may comprise at least one linear motor, and the at least one linear motor may be coupled to a linear-rotary converter operable to convert a linear output of the at least one linear motor into torque for driving one or more of the tilt actuator and the linear actuator.

According to further aspects of the disclosure, there are provided a bicycle comprising any of the above-described devices, and a kit of parts, comprising: a bicycle seat; and any of the above-described devices.

BRIEF DESCRIPTION OF THE DRAWINGS

Detailed embodiments of the disclosure will now be described in connection with the drawings, of which.

DETAILED DESCRIPTION OF SPECIFIC EMBODIMENTS

Figure 1:
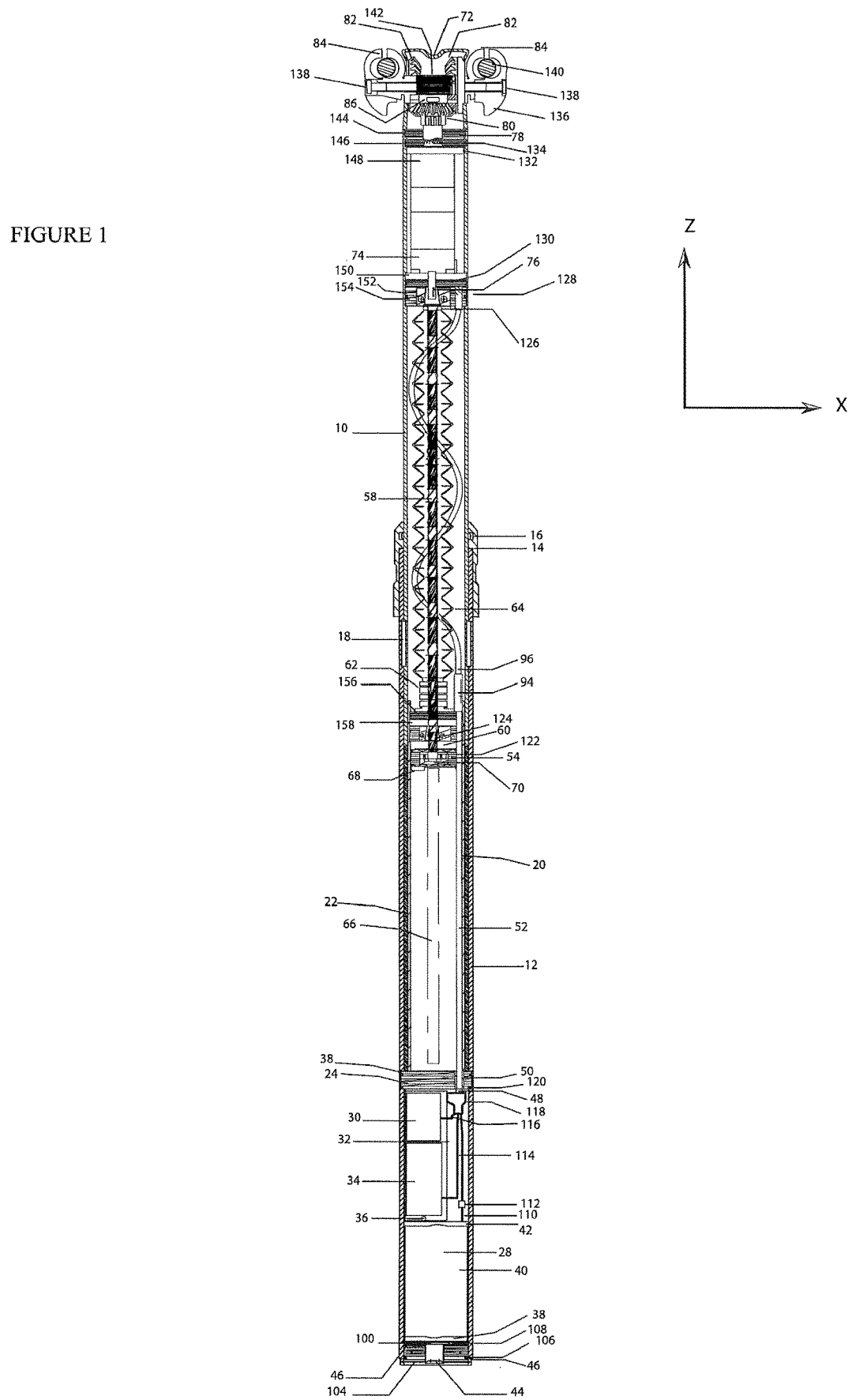
FIG. 1 is a cross-sectional view of a seat post assembly in accordance with a first, motorized embodiment of the disclosure.

The present disclosure seeks to provide an improved device for adjusting a seat position of a bicycle seat. Whilst various embodiments of the disclosure are described below, the disclosure is not limited to these embodiments, and variations of these embodiments may well fall within the scope of the disclosure which is to be limited only by the appended claims.

A brief summary of the specific description follows. This summary is not to be seen as limiting in any way on the scope of the disclosure. Generally, there is described a device for adjusting a position of a bicycle seat. The device includes an upper post that may translate relative to a lower post. The upper post includes a seat coupling which is arranged to couple to a bicycle seat. The lower post includes a seat tube coupling which allows the device to be coupled to a bicycle seat tube. The device also includes a seat adjustment mechanism. The seat adjustment mechanism, by driving movement of the seat coupling relative to the seat tube coupling, is used to adjust a tilt and/or a height of a bicycle seat coupled to the seat coupling. A tilt and height controller is provided on the handlebars of the bicycle and may be controlled by a rider of the bicycle during movement of the bicycle (i.e. when the rider is pedalling). Actuation of the tilt and height controller operates a prime mover which is responsible for providing the force necessary to drive a tilt actuator and a linear actuator which form part of the seat adjustment mechanism.

Two different embodiments of the disclosure are described: a motorized embodiment and a mechanized embodiment. In the motorized embodiment, the prime mover includes an electrical motor. The motor drives a tilt actuator, which forms part of the seat adjustment mechanism and comprises a bevelled seat coupling gear fixed to the seat coupling. Operation of the motor drives rotation of a bevelled drive gear which is in a bevelled coupling with the bevelled seat coupling gear. Thus, operation of the motor converts rotation of the drive gear about the z-axis (i.e. the axis along which the upper and lower posts translate) into rotation of the seat coupling gear about the x-axis (i.e. the axis about which the seat coupling rotates or tilts). Rotation of the seat coupling gear about the x-axis results in tilting of the seat coupling and corresponding tilting of the bicycle seat.

In an alternative embodiment, the electrical motor (or at least one of the electrical motors) may be configured to output a linear force, as opposed to a torque. Thus, operation of the electrical motor (or one of multiple electrical motors) drives a change in linear position of the motor's drive shaft. A linear-rotary converter then converts the change in linear position of the drive shaft into rotary motion which acts upon the bevelled drive gear which is in a bevelled coupling with the bevelled seat coupling gear, thereby adjusting seat tilt as described above.

Operation of the motor is further arranged to drive a linear actuator, which forms part of the seat adjustment mechanism. The linear actuator comprises a threaded lower shaft in rotatable threaded engagement with the lower post. The lower shaft is fixed to the upper post, and thus rotation of the lower shaft is converted into translation of the upper post relative to the lower post. Operation of the linear actuator therefore drives translation of the upper post relative to the lower post.

In the motorized embodiment, actuation of the motor (i.e. the prime mover) is initiated using the tilt and height controller positioned on the bicycle's handlebars. The controller is communicative with the motor and operates rotation of the linear actuator, resulting in a change in height of the bicycle seat. The change in height is detected by a sensor which is in communication with a control unit. The control unit communicates in turn with the motor to drive operation of the tilt actuator, thereby adjusting a tilt angle of the bicycle seat as a function of the height adjustment of the bicycle seat. The device therefore allows for automatic adjustment of the saddle tilt in conjunction with, and as a function of, adjustment of the saddle height.

According to some embodiments, instead of adjusting tilt in response to a detected change height, the seat adjustment mechanism may be configured such that height is adjusted in response to a detected change in tilt. Furthermore, according to some embodiments, a gear adjustment unit may be used such that rotation of one of the motor's drive shafts is converted into corresponding rotation of another of the motor's drive shafts (i.e. rather than having two independently controlled drive shafts). One of the drive shafts is configured to drive the linear actuator, and the other of the drive shafts is configured to drive the tilt actuator.

In the mechanized embodiment, the prime mover comprises a source of pressurized air, and the linear actuator comprises a piston assembly. The rider may use the height and tilt controller to initiate release of the pressurized air. The pressurized air operates the linear actuator by urging the piston assembly to move along the translation axis. As the piston assembly is fixed to the upper post, operation of the linear actuator drives translation of the upper post relative to the lower post. Thus, using the controller allows the upper post to move both upwards relative to the lower post (if the rider removes sufficient weight from the saddle) and also downwards relative to the lower post (if the rider applies sufficient weight to the saddle).

Similarly to the motorized embodiment, the mechanized embodiment includes a threaded upper shaft fixed to the upper post and in threaded engagement with the lower post. Thus, translation of the piston assembly results in translation of the threaded upper shaft relative to the lower post. Due to the threaded engagement of the threaded upper shaft with the lower post, the threaded upper shaft is caused to rotate about the translation axis as it moves along the translation axis. The mechanized embodiment uses the same tilt actuator as the motorized embodiment. In particular, the threaded upper shaft is rotatably coupled to the drive gear such that rotation of the threaded upper shaft results in corresponding rotation of the seat coupling gear about the tilt axis. Thus, as the upper post translates relative to the lower post, the seat coupling is simultaneously rotated about the tilt axis, resulting in tilting of the bicycle seat. The device therefore allows for adjustment of the saddle height simultaneously to adjustment of the saddle tilt.

A detailed description of these two embodiments will now follow. A complete list of parts referenced in the drawings is included at the end of the description. However, where it is considered that a full description of any of the parts would not assist a person skilled in the art in understanding the disclosure, a description of the part in question has been omitted.

Figure 2:
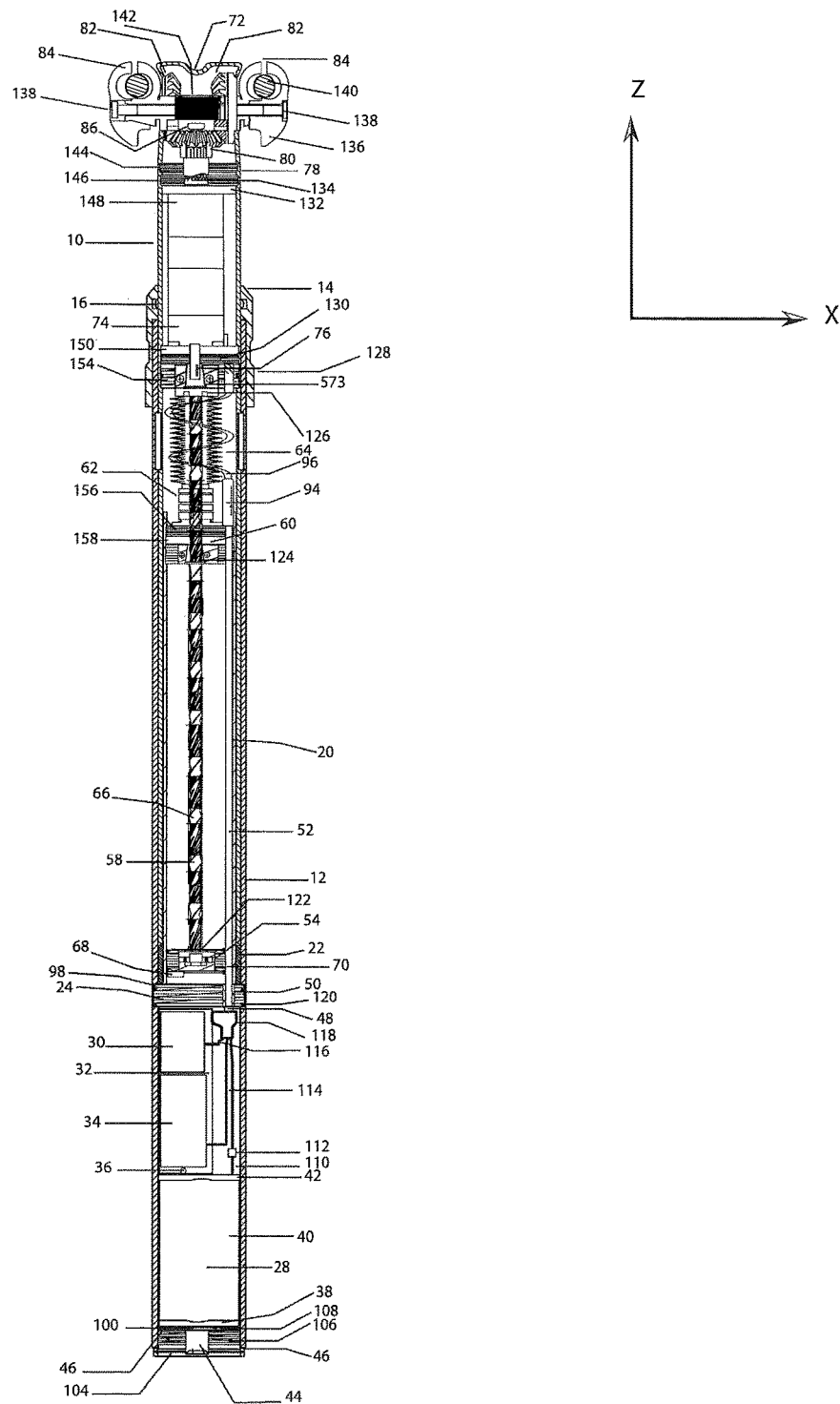
FIG. 2 is a cross-sectional view of the seat post assembly of FIG. 1 in a lowered position.

In accordance with a first embodiment of the disclosure, FIGS. 1 and 2 show a seat post assembly 1000 configured to adjust both a height and a tilt of a bicycle saddle. As will be described in more detail below, this embodiment uses motorized means for adjusting the height and tilt of the saddle, and may therefore be referred to as the motorized embodiment. FIG. 1 shows seat post assembly 1000 in a raised position, whereas FIG. 2 shows seat post assembly 1000 in a lowered position. In FIGS. 1 and 2, like elements are numbered using like reference numbers. The description begins with a description of seat post assembly 1000 in the raised position (FIG. 1).

Seat post assembly 1000 comprises a cylindrical upper post 10 translatable along the z-axis within a cylindrical lower post 12. Upper post 10 is therefore arranged telescope in and out of lower post 12. For the purposes of this description, the z-axis is held to be the axis along which upper post 10 and lower post 12 translate relative to each other. Lower post 12 may accommodate one of various standardized seat post diameters, such as standard to oversized and even greater. Of course, lower post 12 may have any other diameter suitable for its use with a bicycle.

The upper end of lower post 12 is coupled via a collar 14 to upper post 10. At this coupling is provided a dust seal wiper 16 for preventing dust and other contaminants from entering the coupling of lower post 12 to upper post 10. Below collar 14 are provided alignment keys 18 to ensure that, during telescoping/translating, upper post 10 does not spin or rotate within lower post 12. Lower post 12 is affixed at its base to a bicycle's seat tube (not shown). As known in the art, the bicycle seat tube is a permanent element of a bicycle frame which is used to hold and secure in place a bicycle seat post.

Within lower post 12 is a cylindrical post baffle 20. The position of post baffle 20 within lower post 12 defines an annular channel 22 which provides a space to allow upper post 10 to telescope within lower post 12. The base of post baffle 20 is secured to lower post 12 via a threaded and ported coupler insert 24. Coupler insert 24 threads or inserts snuggly into lower post 12 and defines a base for post baffle 20. Coupler insert 24 is fastened with a body circlip 26 that clicks into place to prevent lateral movement or backing off of coupler insert 24 from lower post 12.

The lower portion of lower post 12 forms, beneath coupler insert 24, a chamber 28. Chamber 28 is used to house a number of electronic components. These electronic components include a control unit 30, a mounting sleeve 32, a driver 34, a lower battery mount 38, a battery 40, an upper battery mount 42 and a charging/data port 44. The base of lower post 12 is sealed to prevent the ingress of contaminants into chamber 28. To this end a threaded bottom cap 46 engages the bottom of lower post 12 by threading internally into the bottom opening of lower post 12. An additional hydrophobic coating may be applied to chamber 28 and the electrical components within chamber 28 to further prevent the possibility of a short circuit.

Above lower battery mount 38 is housed battery 40. Battery 40 is sealed to prevent damage to its circuitry/components. Battery 40 is held in place from above via upper battery mount 42 which provides reinforced insulation to the upper side of battery 40. Through a number of leads and other electrical connections, battery 40 provides power to various electrical components in chamber 28, including control unit 30 and driver 34. Charging/data port 44 may be connected to an external power source for recharging battery 40, and/or may be connected to a PC or other computing device for data management purposes. In other embodiments (not shown), the battery may be located within the seat tube of the bicycle frame.

A channel 50 is formed within coupler insert 24 and provides a space through which an electrical conduit 48 may pass through channel 50. Electrical conduit 48 carries electrical wiring from control unit 30, driver 34 and battery 40 to electrical motor 74 described in further detail below. A conduit bushing 52 extends from a wiring harness 118, through channel 50 and through electrical conduit 48. Conduit bushing 52 fully encases the wiring between wiring harness 118 and a guide plate 156 (see below).

Above chamber 28, along the z-axis, there is provided a dual ported linear motion piston 54 configured to translate along the z-axis in correspondence with movement of upper post 10 within lower post 12. Piston 56 is coupled to a high helix lead ball screw 58 via a lead screw termination mount 70. Screw 58 is configured to rotate about the z-axis through activation of motor 74, as will be described in more detail below. A fixed piston guide 60 is secured to the top of post baffle 20. Piston guide 60 is configured to guide rotation of screw 58 within the threads of an affixed lead ball nut 62. The carriage of nut 62 encases the arbour of screw 58, and nut is fixed to lower post 12. Thus, movement of screw 58 linearly along the z-axis will cause corresponding rotation of screw 58 around the z-axis through its threaded engagement with nut 62. A recoil bellow 64 encases screw 58 for protection. A piston cavity 66 exists between coupler insert 24 and a threaded and dual ported lead guide plate 156, and is bounded in part by post baffle 20. Piston 54 is configured to move within piston cavity 66 during translation of piston 54 along the z-axis. Affixed to piston 54 is a height inertial sensor 68. Height inertial sensor 68 is arranged to detect an amount of translation of upper post 10 relative to lower post 12.

A rigid housing ferrule 94 adapts the internal wiring from conduit bushing 52 into a recoil housing 96. This arrangement ensures the wiring can be coiled for optimum length around the circumference of upper post 10. The arrangement furthermore prevents telescoping of upper post 10 in/out of lower post 12 from interfering with the wiring.

Now turning our attention to the top of seat post assembly 1000, there is provided at the top of upper post 10 a bulkhead assembly 72. Beneath bulkhead assembly 72 and housed within upper post 10 is an electric motor 74. Motor 74 may be a D/C motor, an A/C motor, a stepper motor, a gear motor, a stack motor, a gear head motor, a linear motor, a brushless motor, a hysteresis motor, a reluctance motor, a universal motor, a piezoelectric motor, a magnetic motor, a pneumatic motor, a hydraulic motor, or any other suitable type of electric or non-electric motor that may be used to implement the seat position adjustment method described herein. Motor 74 is a dual-head motor and rotates two heads about the z-axis. The dual heads of motor 74 include a lower motor head 76 which faces downward (toward chamber 28) along the z-axis, and an upper motor head 78, which faces upward (toward bulkhead assembly 72) along the z-axis. Both lower motor head 76 and upper motor head 78 may rotate in both clockwise and counter-clockwise directions, when actuated by a controller 90 (not shown in FIG. 1). Lower motor head 76 is coupled to screw 58 via a number of fastening components (referenced in the drawings but not described in more detail here). These components assist in driving a smooth transmission from rotation of lower motor head 76 to rotation of screw 58. Due to the coupling of lower motor head 76 and screw 58, any rotation of lower motor head 76 by motor 74 will result in a corresponding rotation of screw 58.

Upper motor head 78 is coupled to a bevel gear mechanism 80 via a number of fastening components (referenced in the drawings but not described in more detail here). These components assist in driving a smooth transmission from rotation of upper motor head 78 to rotation of bevel gear mechanism 80. Coupled to bevel gear mechanism 80 is a pair of splined satellite bevel gear assemblies 82 in turn coupled to a pair of rail clamp assemblies 84. Due to the bevelled coupling of bevel gear assemblies 82 to bevel gear mechanism 80, bevel gear assemblies 82 are configured to rotate about an axis perpendicular to the rotation axis of bevel gear mechanism 80. In other words, bevel gear assemblies 82 are configured to rotate about an axis perpendicular to the z-axis (i.e. the x-axis). Through the coupling of bevel gear assemblies 82 to rail clamp assemblies 84, rotation of bevel gear assemblies 82 about the x-axis results in corresponding rotation of rail clamp assemblies 84 about the x-axis. Affixed onboard bevel gear mechanism 80 is a tilt inertial sensor 86. Tilt inertial sensor 86 is arranged to detect an amount of rotation of bevel gear mechanism 80, and therefore an amount of rotation of a saddle when coupled to bulkhead assembly 72. As known in the art, rail clamp assemblies 84 are configured to clamp or otherwise secure a bicycle saddle relative to seat post assembly 1000. Rail clamp assemblies 84 are configured to accommodate various rail-clamp diameters including standard and oversized twin rail clamps, and may include single post or beam-like clamping mechanisms.

Figure 9:
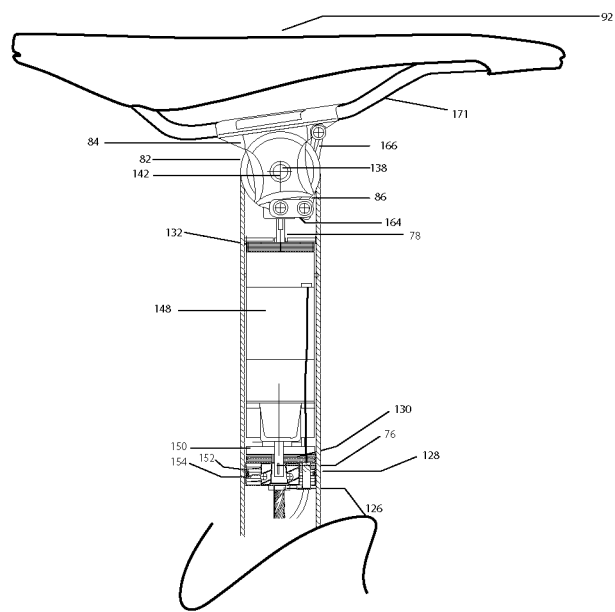
FIG. 9 is a cross-sectional view of an alternative arrangement of the seat post assembly of FIG. 1.

According to some embodiments, the motor may comprise a linear or stepper-like motor. In order to convert the linear output of such a motor into driving and holding torque, a dogbone-like linkage system, or other linear-rotary converter, may be used to couple the motor's output to bevel gear assemblies 82. Such a motor and associated linear-rotary converter, at the cost of increased weight and a greater number of moving parts, may provide a potentially higher threshold holding torque, and may reduce the need for a step-up torque/gear assembly coupled to lower motor head 76. An illustration of such an embodiment is shown in FIG. 9.

Figure 4:
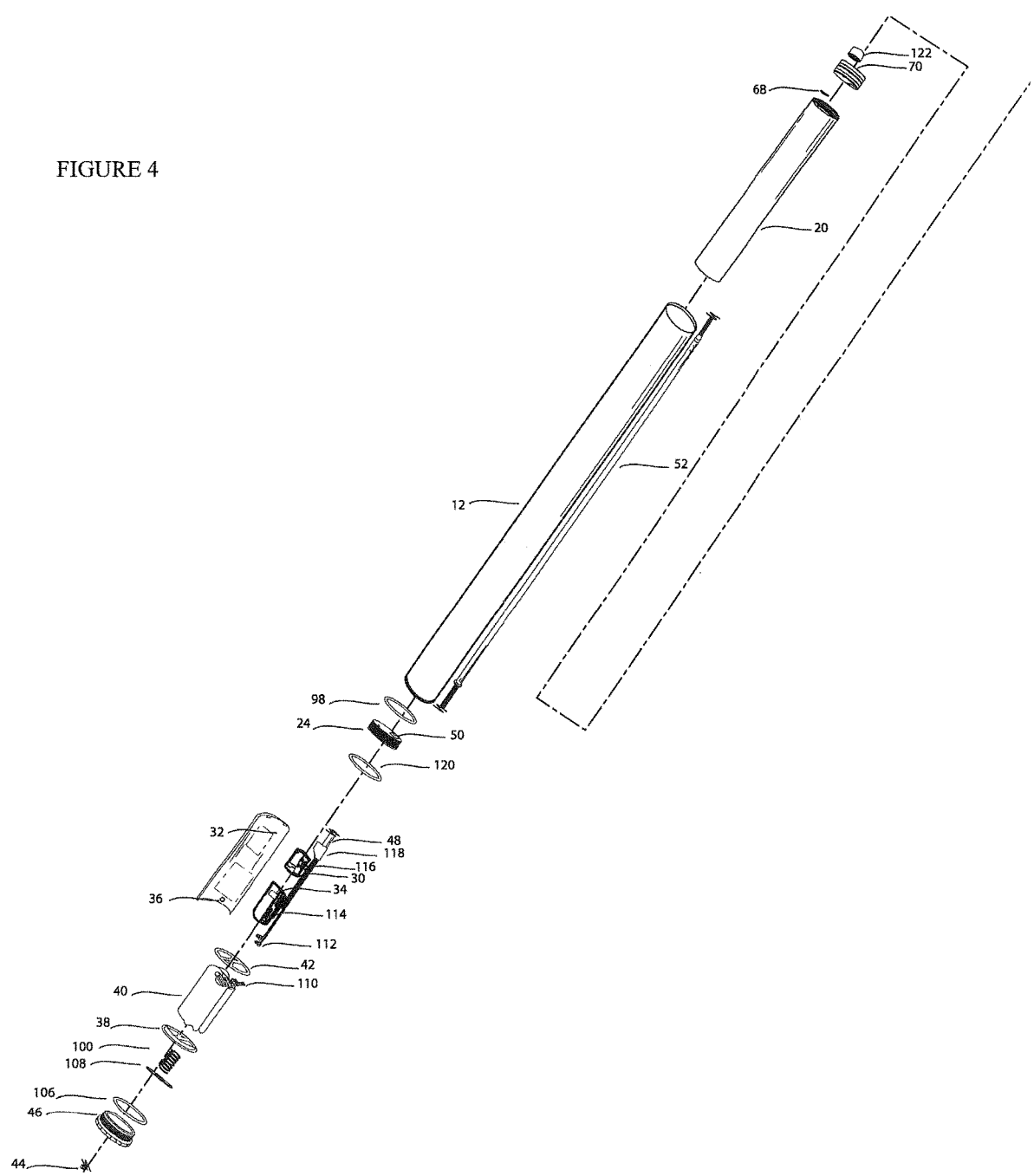
FIG. 4 is an exploded view of a lower portion of the seat post assembly of FIGS. 1 and 2.
Figure 5:
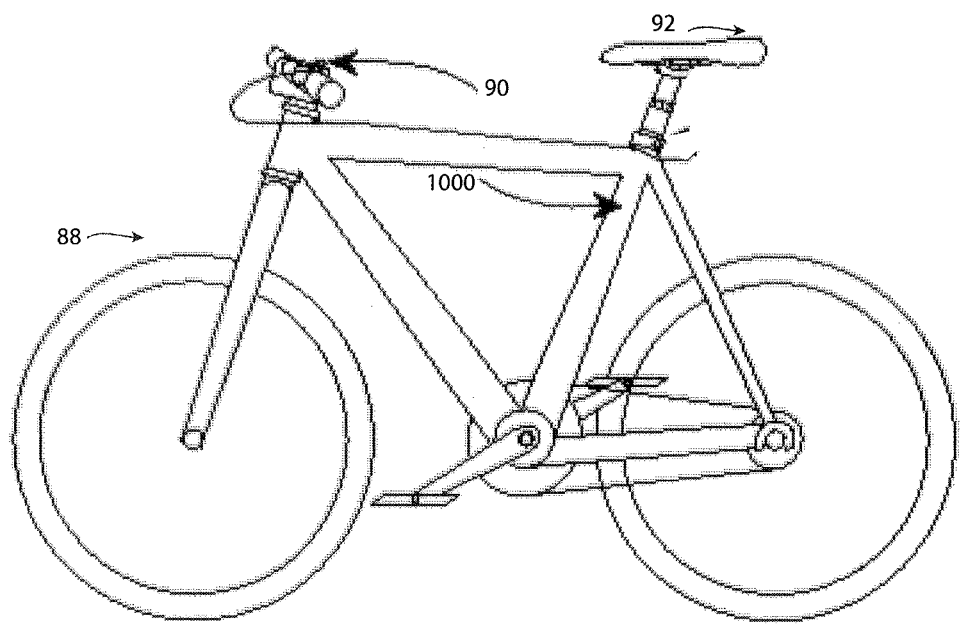
FIG. 5 is a schematic representation of a bicycle incorporating a seat post assembly in accordance with an embodiment of the disclosure.

For additional detail, an exploded view of seat post assembly 1000 is shown in FIGS. 4 and 5. Like elements are numbered using like reference numbers.

Figure 3:
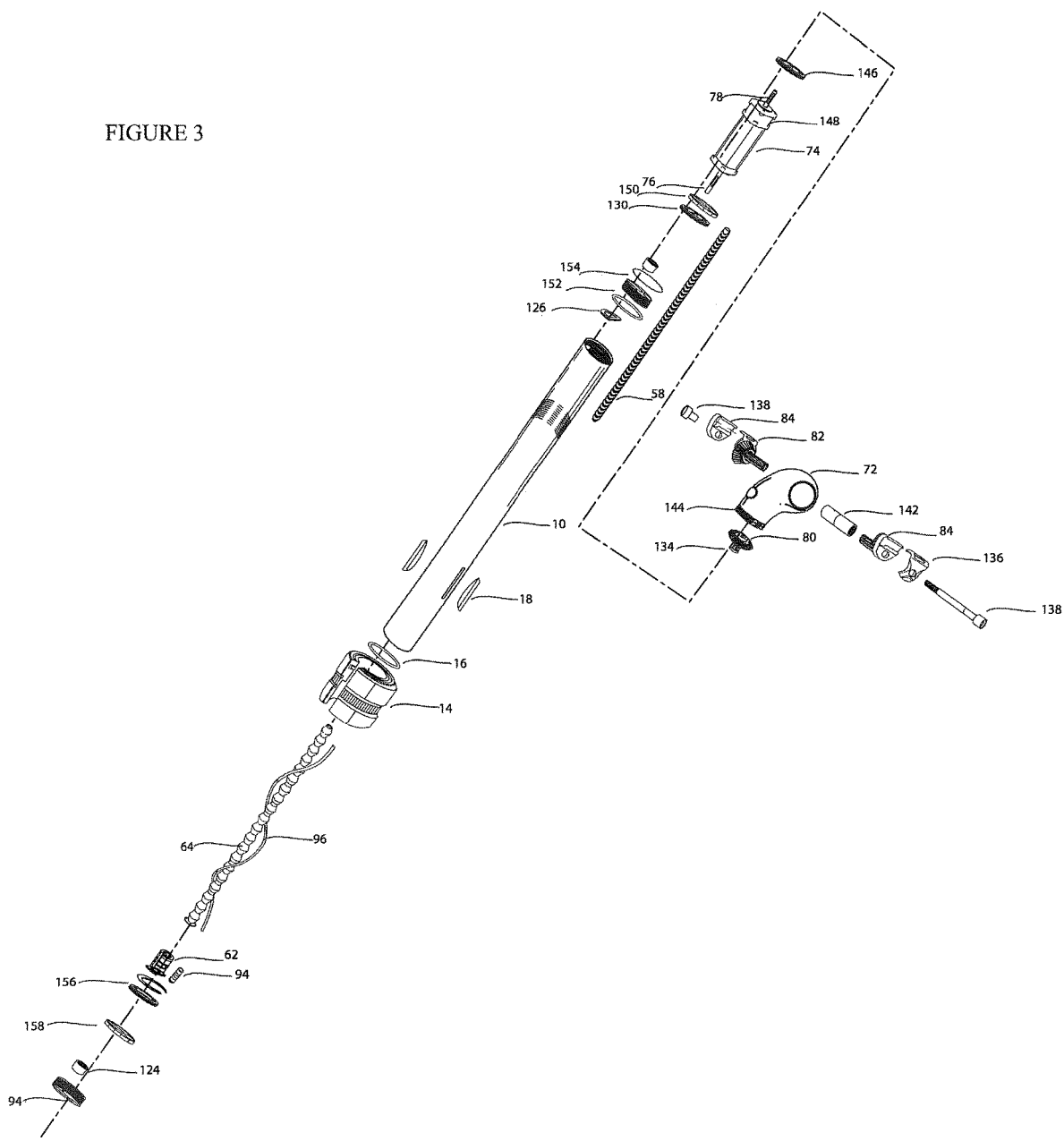
FIG. 3 is an exploded view of an upper portion of the seat post assembly of FIGS. 1 and 2.

In use, seat post assembly 1000 functions as follows. Seat post assembly 1000 is mounted to a bicycle frame of a bicycle 88, for example as schematically shown in FIG. 3. Bicycle 88 includes a controller 90 located on the handlebars of bicycle 88 and therefore within easy reach of a rider. Controller 90 is electrically connected to motor 74.

While riding bicycle 88, the rider may desire to readjust the height and/or the tilt of the saddle 92. For example, if approaching a steep downhill section, the rider may wish to lower the height of saddle 92 as well as tilt saddle 92 upwards. Whilst still in motion, the rider activates controller 90 to initiate a seat adjustment. Activating controller 90 triggers operation of motor 74. The signal received at motor 74 causes motor 74 to rotate lower motor head 76.

Rotation of lower motor head 76 is transmitted to screw 58. Because of the engagement of the threads of screw 58 with nut 62, rotation of screw 58 is converted into linear motion of nut 62 along the z-axis. Because nut 62 is fixed to lower post 12, upper post 10 is caused to telescope relative to lower post 10. In particular, upper post 10 (coupled to screw 58) is caused to telescope into lower post 12 (coupled to nut 62). The linear motion of upper post 10 is guided by piston 54. As a result, the z-position or height of bulkhead assembly 72 relative to the bicycle frame will decrease.

As upper post 10 telescopes within lower post 12, height inertial sensor 68 detects the amount of translation of upper post 10 relative to lower post 12. Height inertial sensor 68 is in communication (wired or otherwise) with control unit 30 and provides as, an input to control unit 30, data regarding the amount of height adjustment (i.e. the degree of translation of upper post 10 relative to lower post 12). Based on this input, control unit 30 determines by how much the tilt of the saddle is to be adjusted (as a function of by how much the height of the saddle has been adjusted). Control unit 30 instructs motor 74 to operate upper motor head 78 so as to raise the tilt of saddle 90. A gear reduction unit 148 within motor 74 provides a predetermined reduction in the rotation of upper motor head 78 relative to the rotation of lower motor head 76. Through the bevelled engagement of bevel gear mechanism 80 with bevel gear assemblies 82, rotation of upper motor head 78 results in rotation of rail clamp assemblies 84 about the x-axis. Rotation of rail clamp assemblies 84 about the x-axis axis results in an adjustment of a tilt angle of saddle 92 relative to the horizontal. In particular, in the present example of the rider approaching a downhill section and activating controller 92, saddle height is decreased and saddle 90 is tilted upwards.

In embodiments where tilt is adjusted in response to height, a step-up torque/gear assembly may be included in order to provide a predetermined increase in the rotation of upper motor head 78 relative to the rotation of lower motor head 76.

In embodiments where multiple motors provide independently controllable outputs to both the seat tilt adjustment and the seat height adjustment, there may be no need for a gear reduction unit or a gear increase unit. However, a gear reduction unit or a gear increase unit may be used to provide fine-tuned position adjustments to the seat height/seat tilt.

It is generally desirable to tilt a saddle upwards and lower saddle height for downhill sections. Similarly it is generally desirable to tilt a saddle downwardly and raise saddle height for uphill sections. Therefore the respective rotation directions of lower motor head 76 and upper motor head 78 may be pre-set accordingly. In addition the ratio of saddle tilt adjustment to saddle height adjustment may be pre-set, or alternatively may be adjusted at any point through appropriate adjustment of gear reduction mechanism 148. Generally, it is desirable that 16 mm change in height corresponds to 0.4° to 2.5° of tilt, although the particular preference will vary from one rider to the next.

FIG. 2 shows seat post assembly 1000 in the lowered position. Of course, upper post 10 may be telescoped back out of lower post 12 by activating controller 90 again such that the lower and upper motor heads 76, 78 rotate in opposite directions to that in which they rotated when lowering the seat height.

Thus, rotation of lower motor head 76 in either of two directions results in corresponding lowering or raising of bulkhead assembly 72, through the threaded engagement of screw 58 with nut 62 fixedly coupled to lower post 12. The translation of upper post 10 relative to lower post 12 is detected by height inertial sensor 68 and communicated to control unit 30. Control unit 30 instructs near simultaneous rotation of upper motor head 76 to provide corresponding rotation of rail clamp assemblies 84 about the x-axis, thereby tilting a saddle attached to bulkhead assembly 72 either upwards or downwards (depending on the direction of translation of upper post 10).

It is conceivable that a rider may wish to operate lowering/raising of the saddle independently of saddle tilt. Thus, controller 90 may be configured to provide control of lower motor head 76 independently of upper motor head 78, and vice versa. In this case, seat post assembly 1000 may be provided without inertial sensors 68 and 86, and without control unit 30, and controller 90 would then operate each motor head 76, 78 independently of the other. The rider could therefore be provided with three seat position adjustment options via controller 90: 1) adjust seat height and seat tilt simultaneously; 2) adjust seat height only; and 3) adjust seat tilt only. Alternatively, it is envisaged that motor 74 could be replaced with two individual motors, each motor operating one of lower motor head 76 and upper motor head 78 independently of the other. In this embodiment, controller 90 would include a controller for operating one motor, and another controller for operating the second motor.

Figure 6:
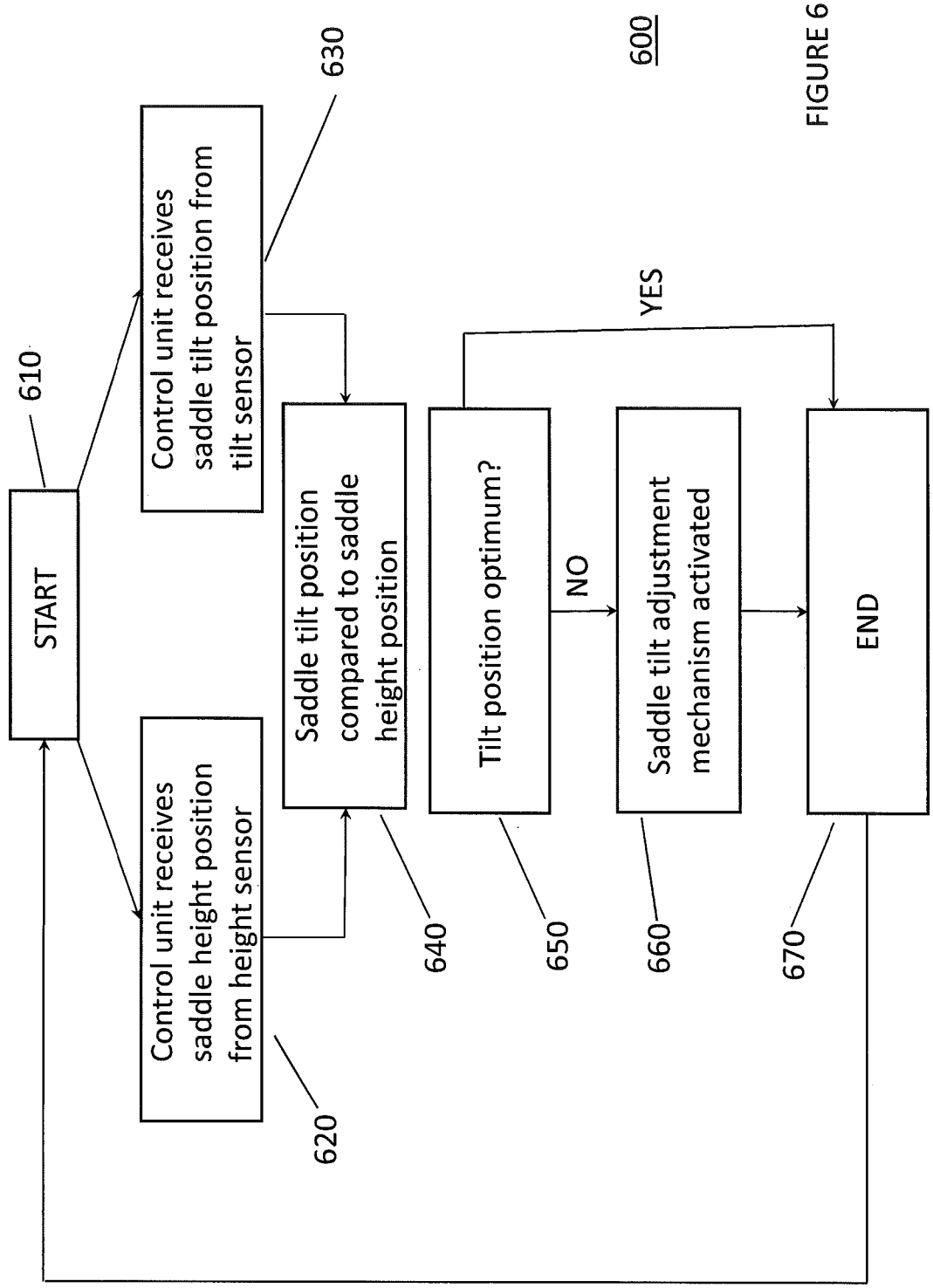
FIG. 6 is a flowchart showing a process of adjusting a position of a bicycle seat, in accordance with an embodiment of the disclosure.

FIG. 6 illustrates an exemplary process 600 that may be executed by control unit 30 in order to effect automatic seat height adjustment and seat tilt adjustment. At step 610, process 600 commences. At step 620, in response to a change in height of the saddle, the new height position of the saddle is received at control unit 30. In particular, the new height position is determined by height inertial sensor 68 and sent to control unit 30. At step 630, the current tilt position of the saddle is received. In particular, the current tilt position is determined by tilt inertial sensor 86 and sent to control unit 30. In other embodiments, rather than the inertial sensors sending their respective position information to control unit 30, control unit 30 may query height inertial sensor 68 and tilt inertial sensor 86 for height and tilt position information, respectively. At step 640, control unit 30 compares the current tilt position to the new height position. The comparison may include a determination of whether, for a given height position, the tilt position is within a pre-set range tilt positions. The present ranges may be stored in a database of pre-set ranges, stored within a memory of control unit 30.

At step 650, control unit 30 determines whether the current tilt position is optimal, based on the comparison at step 630. An optimal tilt position may be a tilt position which is, for a given height position, within a pre-set range tilt positions. If the tilt position is outside of the pre-set range, then control unit 30 determines that the current tilt position is not optimal. In this case, control unit 30 sends an instruction to motor 74 to initiate operation of the tilt position adjustment mechanism. In other words, control unit 30 causes motor 74 to initiate rotation of upper motor head 78 so as to adjust the tilt position of the saddle. The tilt position of the saddle is then adjusted as a function of the new height position of the saddle. Thus, during use of seat post assembly 1000, adjustment of the height of the saddle (i.e. adjustment of the height position) will lead to an automatic and corresponding adjustment of a tilt of the saddle (i.e. adjustment of the tilt position).

In alternative embodiments, it is envisaged that, instead of tilt position being adjusted in response to height position, it is height position which is adjusted in response to a change in tilt position. Thus, actuation of controller 90 will cause operation of the tilt adjustment mechanism. Operation of the tilt adjustment mechanism results in a change of the saddle's tilt position which is measured by tilt inertial sensor 86. Tilt inertial sensor 86 communicates the new tilt position to control unit 30. Control unit 30 then compares the new tilt position to the current height position and determines whether the current height position is no longer optimum relative to the new tilt position. If the current height position is no longer optimum, then control unit 30 then sends an instruction to motor 74 to operate the height adjustment mechanism (i.e. by causing rotation of screw 58) to cause upper post 10 to translate relative to lower post 12.

The speed at which control unit 30 operates is sufficiently high such that, to the rider, the tilt adjustment mechanism and the height adjustment mechanism operate substantially simultaneously, although in reality one is operated in response to operation of the other.

Figure 7:
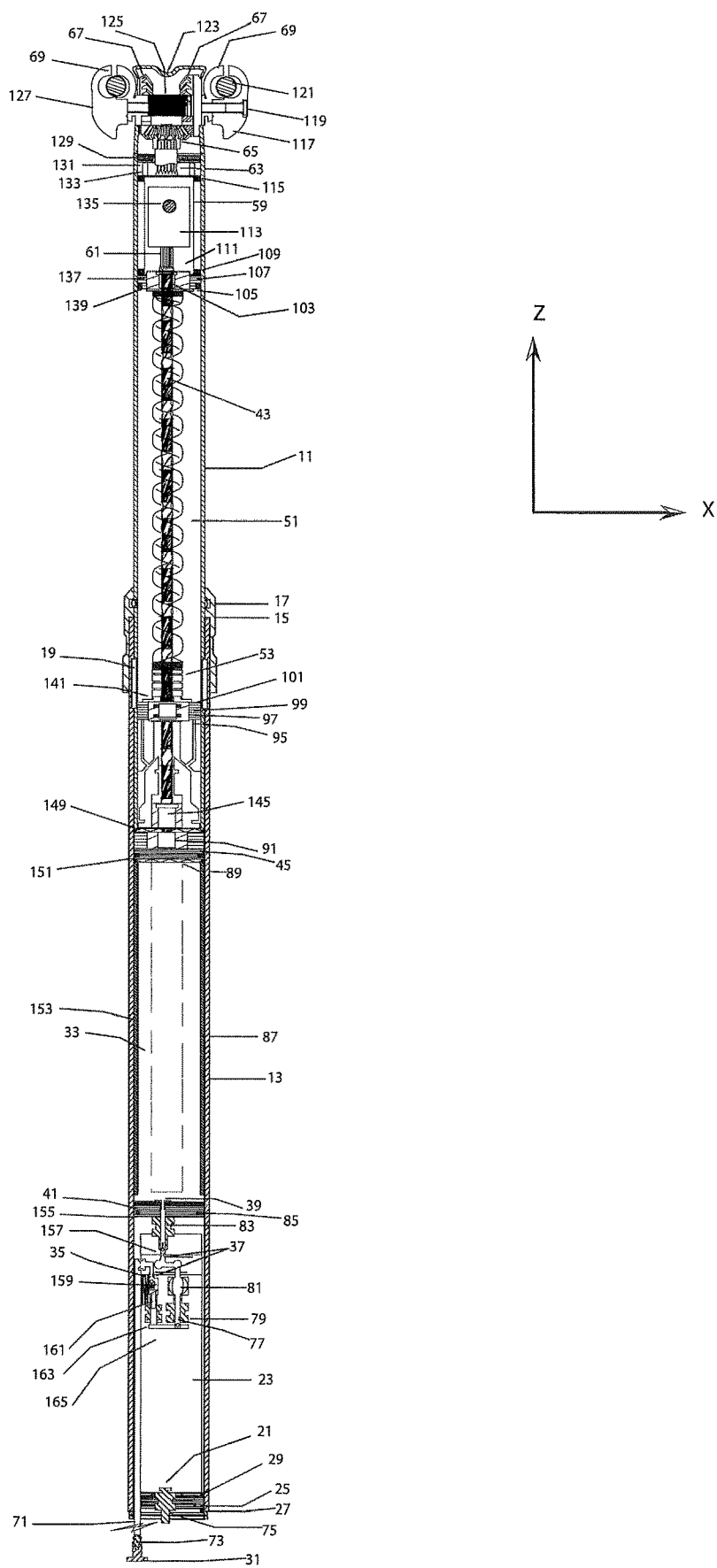
FIG. 7 is a cross-sectional view of a seat post assembly in accordance with a second, mechanized embodiment of the disclosure.
Figure 8:
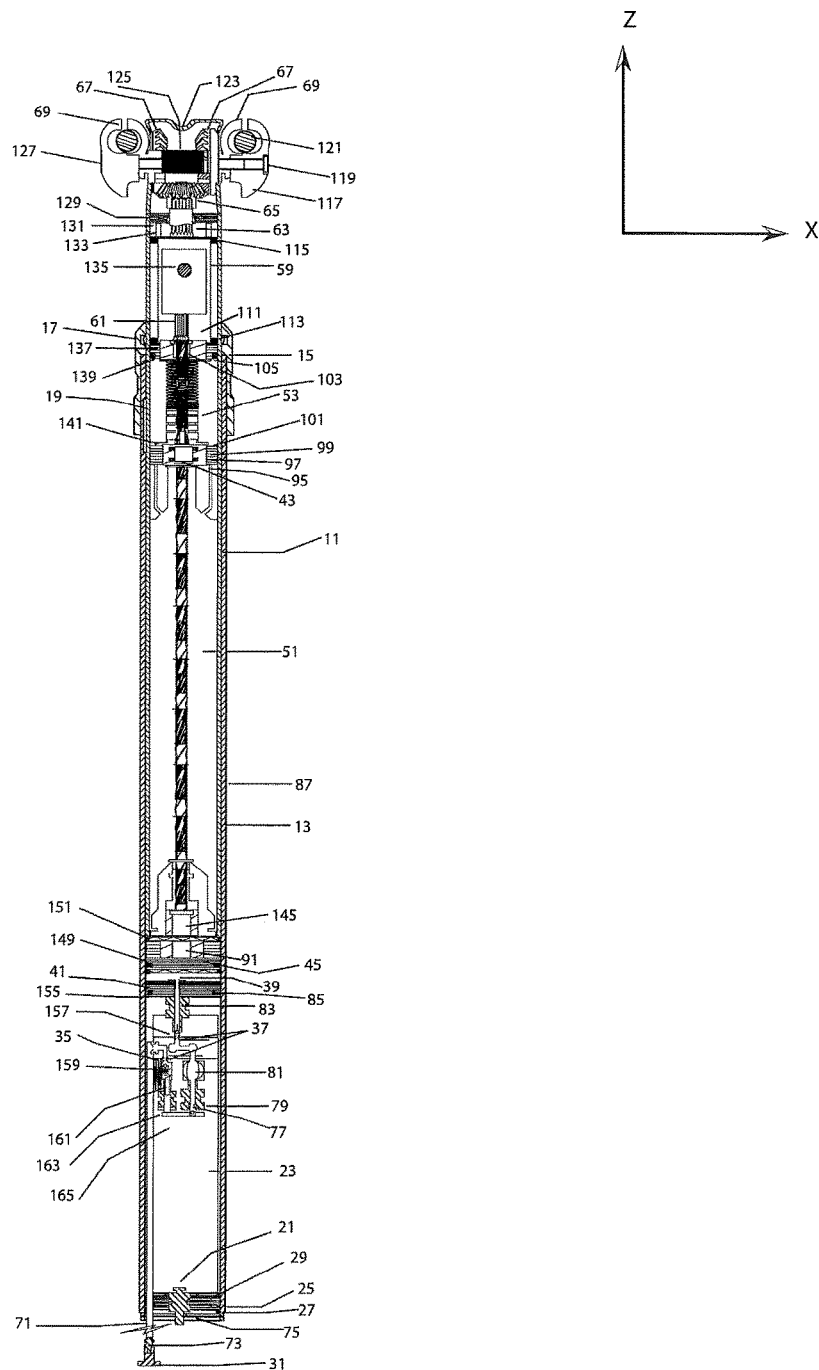
FIG. 8 is a cross-sectional view of the seat post assembly of FIG. 7 in a lowered position.

In accordance with a second embodiment of the disclosure, FIGS. 8 and 9 show a seat post assembly 2000 configured to adjust both a height and a tilt of a bicycle saddle. This embodiment uses only mechanical means for adjusting the height and tilt of the saddle, and is therefore referred to as the mechanized embodiment. FIG. 7 shows seat post assembly 2000 in a raised position, whereas FIG. 8 shows seat post assembly 2000 in a lowered position. In FIGS. 8 and 9, like elements are numbered using like reference numbers. The description begins with a description of seat post assembly 2000 in the raised position (FIG. 8).

Seat post assembly 2000 comprises a cylindrical upper post 11 translatable along the z-axis within a cylindrical lower post 13. Upper post 11 is therefore arranged telescope in and out of lower post 13. Lower post 13 may accommodate one of various standardized seat post diameters, such as standard to oversized and even greater. Of course, lower post 13 may have any other diameter suitable for its use with a bicycle.

The upper end of lower post 13 is coupled via a collar 15 to upper post 11. At this coupling is provided a dust seal wiper 17 for preventing dust and other contaminants from entering the coupling of lower post 13 to upper post 11. Below collar 15 are provided alignment keys 19 to ensure that, during telescoping/translating, upper post 11 does not spin or rotate within lower post 13. Lower post 13 is affixed at its base to a bicycle's seat tube (not shown). As known in the art, the bicycle seat tube is a permanent element of a bicycle frame which is used to hold and secure in place a bicycle seat post.

In the base of lower post 13 is provided a base inflation valve 21. Base inflation valve 21, when open, provides a fluid communication flow path from the exterior of seat post assembly 2000 to an air chamber 23. Air can be pumped into chamber 23 via base inflation valve 21 in order to provide a source of pressurised air within chamber 23. The valve stem on base inflation valve 21 may be a Schrader valve stem, a Presta valve stem, or any other suitable valve stem which would require a pumping tool such as a bicycle pump to obtain the desired pressure within chamber 23. O-rings 25, 27 and a threaded bottom cap 29 are used to seal chamber 23.

A controller 31 extends from within chamber 23 to a location where controller 31 may be operated by the bicycle rider while the bicycle is in motion. Controller 31 may be a lever, a button, or other like device, and typically is mounted on the handlebars of the bicycle, for easy reach by the rider. In the embodiment of FIG. 8, controller 31 is a pressurized hydraulic oil controller.

Chamber 23 houses a pressurized air delivery system configured to allow pressurized air to flow from within chamber 23 to piston cavity 33. In particular chamber 23 houses, amongst other components, a valve ball 35 and a valve seat 37. Various other components are housed within chamber 23. These are not described in detail here but are referenced accordingly in FIG. 1.

When controller 31 is actuated, hydraulic pressure displaces the position of valve ball 35 relative to valve seat 37. A fluid flow path is then opened from chamber 23 to piston cavity 33, and pressurized air may flow from chamber 23 into piston cavity 33 via an air aperture 39 at the base of piston cavity 33. A threaded orifice coupler insert 41 is provided between chamber 23 and piston cavity 33 and serves to provide a secure seal between chamber 23 and piston cavity 33.

Above chamber 23 and along the z-axis is located a high helix lead ball screw 43 joined at one end to a centrally ported linear motion piston 45. Piston 45 is configured to translate vertically along the z-axis relative to lower post 13. High tolerance rod O-rings 47, 49 prevent air from escaping from piston cavity 33, as piston 45 moves dynamically or remains static. Therefore, air may only enter and exit piston cavity 33 via air aperture 39 connecting chamber 23 and piston cavity 33. A compression spring 51 is housed within upper post 11 and arranged to exert a downwardly biasing force on piston 45. That is, spring 51 is configured to urge upper post 11 to telescope out of lower post 13.

An affixed lead ball nut 53 is affixed to lower post 13. The carriage of nut 53 encases the arbour of screw 43. Thus, movement of piston 45 along the z-axis and within lower post 13 will urge screw 43 to move linearly within nut 53. Because nut 53 is fixed to lower post 13, nut 53 imparts rotational motion of screw 43 during translation of screw 43. Thus, movement of piston 45 within lower post 13 results in rotation of screw 43 about the z-axis. Rotation of screw 43 is guided via a mid-lead guide bearing 55 and a threaded and ported lead guide plate 57.

At the topmost end of screw 43, screw 43 enters a gear reduction unit 59. Gear reduction unit 59 is dual-headed and comprises a lower gear reduction driver 61 which faces downward (toward piston 45) and an upper input driver 63 which faces upward (away from piston 54). Both lower gear reduction driver 61 and upper input driver 63 may rotate in both clockwise and counter-clockwise directions. Lower gear reduction driver 61 is coupled to screw 43 via a number of fastening components (referenced in the drawings but not described in more detail here). These components assist in driving a smooth transmission from rotation of lower gear reduction driver 61 to rotation of screw 45. Upper input driver 63 is coupled to a bevel gear mechanism 65 via a number of fastening components (referenced in the drawings but not described in more detail here). These components assist in driving a smooth transmission from rotation of upper input driver 63 to rotation of bevel gear mechanism 65.

Coupled to bevel gear mechanism 65 is a pair of splined satellite bevel gear assemblies 67 in turn coupled to a pair of rail clamp assemblies 69. Due to the bevelled coupling of bevel gear assemblies 67 to bevel gear mechanism 65, bevel gear assemblies 67 are configured to rotate about an axis perpendicular to the rotation axis of bevel gear mechanism 5. In other words, bevel gear assemblies 7 are configured to rotate about an axis perpendicular to the z-axis (i.e. the x-axis). Through the coupling of bevel gear assemblies 67 to rail clamp assemblies 69, rotation of bevel gear assemblies 67 about the x-axis results in corresponding rotation of rail clamp assemblies 69 about the x-axis. As known in the art, rail clamp assemblies 69 are configured to clamp or otherwise secure a bicycle saddle relative to seat post assembly 2000.

In use, seat post assembly 2000 functions as follows. Seat post assembly 2000 is mounted to a bicycle frame of a bicycle (for example a bicycle as shown in FIG. 5). Controller 31 is on the handlebars of the bicycle and therefore within easy reach of the rider. While riding the bicycle, the rider may desire to readjust the height and/or the tilt of the saddle. For example, if approaching a steep downhill section, the rider may wish to lower the height of the saddle as well as tilt the saddle upwards. Whilst still in motion, the rider activates controller 31 to initiate a seat adjustment.

Activating controller 31 causes valve ball 35 to move away from valve seat 37, as described above. When the valve is opened, the pressurized air within air chamber 23 flows into piston cavity 33 via aperture 39. The expansion of the air as it flows into piston cavity 33 results on an upwards force being exerted on piston 45. Piston 45 is therefore urged upwards by the pressurized air entering piston cavity 33. However, with the rider's full weight applied on the saddle, the weight is sufficient to overcome the upward force exerted on piston 45. As a result piston 45 will translate downwards, compressing the air in piston cavity 33 back into chamber 23 through aperture 39. As piston 45 is coupled to upper post 11, upper post 11 will translate downwards by telescoping into lower post 13. Compression spring 51 ensures that the downward translation of piston 45 is sufficiently dampened to prevent the rider from completely telescoping upper post 11 within lower post 13 and potentially damaging the device.

Once upper post 11 has reached the desired (lower) height, the rider may deactivate controller 31. Deactivation of controller 31 results in valve ball 35 realigning with valve seat 37 and preventing air from flowing between piston cavity 33 chamber 23. Once the valve is closed, the upward force exerted on piston 45 by the compressed air in piston cavity 33 balances the downward force exerted on piston 45 by the rider's weight. The rider may then reapply their full weight on the saddle as, even with their full weight applied, it is insufficient to further compress the air contained within piston cavity 33.

Because of the engagement of the threads of screw 43 with stationary nut 53, translation of upper post 11 along the z-axis results in rotation of screw 43 about the z-axis. Rotation is screw 43 is transmitted to lower gear reduction driver 61, input bevel gear mechanism 63 and bevel gear mechanism 65. Through the bevelled engagement of bevel gear mechanism 65 with bevel gear assemblies 67, rotation of input bevel gear mechanism 63 results in rotation of rail clamp assemblies 69 about the x-axis. Rotation of rail clamp assemblies 69 about the x-axis axis results in an adjustment of a tilt angle of the bicycle saddle relative to the horizontal. In particular, in the present example of the rider approaching a downhill section and activating controller 31, saddle height is decreased and the saddle is tilted upwards. FIG. 8 shows seat post assembly 2000 in a lowered position.

Conversely, the rider may wish to raise their saddle from a lowered position to a raised position. The rider would then activate controller 31, thereby opening the valve and releasing pressurized air into piston cavity 33. The release of pressurized air urges piston 45 upwards. In order to allow piston 45 and upper post 11 to translate upwards, the rider would need to lift some of their weight off the saddle, for example by raising their hips slightly. When sufficient weight has been removed, piston 45 will translate upwards under the force of the pressurized air expanding into piston cavity 33. Compression spring 51 assists with the upward translation of piston 45. Once the desired height is reached, the rider reactivates controller 31 to close the valve. Again, during upwards translation of piston 45, screw 43 will be caused to rotate through its threaded engagement with nut 53 which is affixed to lower post 13. The rotation of screw 43 results in titling of the saddle through bevel gear mechanism 65 and bevel gear assemblies 67 as described above (in this case, during raising of the saddle, the saddle tilts downwards).

Thus, vertical translation of piston 45 results in lowering or raising of the saddle, through the action of pressurized air entering piston cavity 33. Simultaneously, translation of screw 43 through threaded nut 53 results in rotation of screw 43. Rotation of screw 43 causes bevel gear mechanism 65 and bevel gear assemblies 67 to tilt the saddle either upwards or downwards, depending on which way screw 43 is rotating.

Whilst the disclosure has been described in connection with specific embodiments, it is to be understood that the disclosure is not limited to these embodiments, and that alterations, modifications, and variations of these embodiments may be carried out by the skilled person without departing from the scope of the disclosure. It is furthermore contemplated that any part of any aspect or embodiment discussed in this specification can be implemented or combined with any part of any other aspect or embodiment discussed in this specification.

For example, it is conceivable that, given the mechanized embodiment, a rider may wish to operate lowering/raising of the saddle independently of saddle tilt. The mechanized embodiment could be modified such the rotation of the threaded screw 43 is decoupled from the bevel gear mechanism 65. The bevel gear mechanism could then be operated using a second controller positioned for example on the handlebars. For instance, a rack and pinion-type arrangement could be used to convert linear motion of the controller into rotational motion arranged to rotate the bevel gear mechanism. This is merely once possible example of how, in the mechanized embodiment, lowering/raising of the saddle could be operated independently of saddle tilt.

PARTS LIST—MOTORIZED EMBODIMENT

10 Upper post
12 Lower post
14 Collar
16 Dust seal wiper
18 Alignment keys
20 Post baffle
22 Annular channel
24 Coupler insert
26 Body circlip
28 Chamber
30 Control unit
32 Mounting sleeve
34 Driver
36 Detent
38 Lower battery mount
40 Battery
42 Upper battery mount
44 Charging/data port
46 Threaded bottom cap
48 Electrical conduit
50 Channel
52 Conduit bushing
54 Piston
58 Screw/shaft
60 Piston guide
62 Ball nut/roller
64 Recoil bellow
66 Piston cavity
68 Height inertial sensor
70 Lead screw termination mount
72 Bulkhead assembly
74 Electric motor
76 Lower motor head
78 Upper motor head
80 Bevel gear mechanism
82 Bevel gear assemblies
84 Rail clamp assemblies
86 Tilt inertial sensor
88 Bicycle
90 Controller
92 Saddle
94 Housing ferrule
96 Recoil housing
98 O-ring
100 Bottom cap spring
102 Threaded bottom cap
104 Body circlip
106 O-ring
108 Flat washer
110 Battery leads
112 Battery lead connectors
114 Driver leads
116 Control unit leads
118 Wiring harness
120 O-ring
122 Lower lead guide bearing
124 Mid lead guide bearing
126 Upper bellow washer
128 Upper lead cavity
130 Lower threaded motor coupler mount
132 Upper motor dampening spacer
134 Input driver
136 Exterior rail clamp
138 Hex rail fastener
140 Saddle rail
142 Spline bushing
144 Threaded bulkhead
146 Upper threaded coupler mount
148 Gear reduction unit/step-up torque unit
150 Lower motor dampening spacer
152 O-ring
154 Threaded and dual ported coupler
156 Threaded and dual ported lead guide plate
158 Dampening spacer
160 Threaded and dual ported coupler
162 O-ring
164 Lower linkage module
166 Upper linkage module
573 Upper lead guide bearing

PARTS LIST—MECHANIZED EMBODIMENT

11 Upper post
13 Lower post
15 Collar
17 Dust seal wiper
19 Alignment keys
21 Base inflation valve
23 Air chamber
25 O-ring
27 O-ring
29 Threaded bottom cap
31 Controller
33 Piston cavity
35 Valve ball
37 Valve seat
39 Air aperture
41 Threaded orifice coupler insert
43 High helix lead ball screw
45 Piston
47 O-ring
49 O-ring
51 Compression spring
53 Affixed lead ball nut
55 Mid-lead guide bearing
57 Threaded and ported lead guide plate
59 Gear reduction unit
61 Lower gear reduction driver
63 Upper input driver
65 Bevel gear mechanism
67 Splined satellite bevel gear assemblies
69 Rail clamp assemblies 71 Controller housing
73 Hydraulic muffler fitting
75 Body circlip
77 Orifice
79 Inlet manifold
81 Air distribution system
83 Discharge manifold
85 O-ring
87 Piston pathway
89 Body circlip
91 Lower guide bearing
93 Ball nut fasteners
95 Gland bushing
97 Gland O-ring
99 Threaded and ported lead guide plate
101 O-ring
103 Upper guide bearing
105 O-ring
107 Lower threaded gear reduction coupler mount
109 Dampening assembly
111 Lower dampening spacer
113 Reduction gears
115 Upper dampening assembly
117 Exterior rail clamp
119 Hex rail fastener
121 Saddle rail
123 Bulkhead assembly
125 Spline bushing
127 Hex rail fastener
129 Threaded bulkhead
131 Upper threaded coupler mount
133 Upper gear assembly fasteners
135 Tilt adjustment key
137 Lower gear assembly fasteners
139 Body circlip
141 Body circlip
143 Spline bushing
145 Mid-lead guide bearing
147 Lead screw bumper
149 O-ring
151 O-ring
153 Upper post pathway
155 Body circlip
157 Valve ball
159 Hydraulic oil chamber
161 Air inlet bushing

The invention claimed is:

1. A device for adjusting a seat position of a bicycle seat, the device comprising:
   a seat tube coupling configured to couple to a bicycle seat tube;
   a seat coupling configured to couple to a bicycle seat;
   a tilt inertial sensor arranged to determine a tilt of the seat coupling relative to the seat tube coupling;
   a seat adjustment mechanism comprising:
      a tilt actuator operable to adjust, about a tilt axis, the tilt of the seat coupling relative to the seat tube coupling; and
      a prime mover comprising at least one motor movably coupled to the tilt actuator and operable to actuate the tilt actuator;
   a tilt controller remote from and communicative with the seat adjustment mechanism and operable by a rider of a bicycle to actuate the tilt actuator and thereby adjust the tilt of the seat coupling relative to the seat tube coupling; and
   a control unit communicative with the tilt inertial sensor and the tilt controller and configured, in response to a signal received from the tilt controller, to operate the seat adjustment mechanism by causing the at least one motor to actuate the tilt actuator and thereby adjust, about the tilt axis, the tilt of the seat coupling relative to the seat tube coupling.

2. The device of claim 1, wherein the seat adjustment mechanism further comprises a linear actuator operable to linearly translate the seat tube coupling relative to the seat coupling, wherein the at least one motor is movably coupled to the linear actuator and operable to actuate the linear actuator and thereby cause linear translation of the seat tube coupling relative to the seat coupling, and wherein the device further comprises a height controller remote from and communicative with the seat adjustment mechanism and operable by a rider of a bicycle to actuate the linear actuator and thereby adjust a height of the seat coupling relative to the seat tube coupling.

3. The device of claim 2, wherein the seat adjustment mechanism further comprises:
   a lower post coupled to the seat tube coupling and defining a translation axis; and
   an upper post coupled to the seat coupling and translatable relative to the lower post along the translation axis,
   wherein the linear actuator is coupled to the lower post and upper post, and wherein the linear actuator is actuable by the prime mover to linearly translate the lower post relative to the upper post.

4. The device of claim 2, further comprising:
   a height sensor configured to determine a height of the seat coupling relative to the seat tube coupling,
   wherein the control unit is further communicative with the height sensor and configured, based on the determined height and tilt of the seat coupling relative to the seat tube coupling, to actuate one or more of the tilt actuator and the linear actuator.

5. The device of claim 1, wherein the tilt actuator comprises a seat coupling gear fixed to the seat coupling.

6. The device of claim 5, wherein the at least one motor is operable to drive rotation of a drive gear rotatably coupled to the seat coupling gear, and thereby cause rotation of the seat coupling gear.

7. The device of claim 6, wherein one or more of the drive gear and the seat coupling gear are bevelled, toothed, or comprise one or more bearings.

8. The device of claim 1, wherein the at least one motor is operable to drive a drive shaft movably coupled to the tilt actuator.

9. The device of claim 1, wherein the tilt controller comprises a tilt control interface operable by the rider to actuate the tilt actuator when the bicycle is in motion.

10. The device of claim 1, wherein the at least one motor comprises at least one linear motor, and wherein the at least one linear motor is coupled to a linear-rotary converter operable to convert a linear output of the at least one linear motor into torque for driving the tilt actuator.

11. A bicycle comprising a device according to claim 1.

12. The device of claim 1, wherein the seat adjustment mechanism further comprises a bevel gear mechanism to which is affixed the tilt inertial sensor.

13. The device of claim 12, wherein the seat adjustment mechanism further comprises a pair of satellite bevel gears assemblies coupled to the bevel gear mechanism.

14. The device of claim 13, wherein the seat adjustment mechanism further comprises a dog bone linkage system coupling an output of the at least one motor to the pair of satellite bevel gears assemblies.

15. The device of claim 14, wherein the dog bone linkage system comprises a lower linkage module rotatably coupled to an upper linkage module.

16. A device for adjusting a seat position of a bicycle seat, the device comprising:
- a seat tube coupling configured to couple to a bicycle seat tube;
- a seat coupling configured to couple to a bicycle seat;
- a tilt inertial sensor arranged to determine a tilt of the seat coupling relative to the seat tube coupling;
- a seat adjustment mechanism comprising a tilt actuator operable to adjust, about a tilt axis, a tilt of the seat coupling relative to the seat tube coupling, wherein the tilt actuator comprises a seat coupling gear fixed to the seat coupling, and wherein the seat adjustment mechanism further comprises a prime mover movably coupled to the seat coupling gear such that movement of the prime mover causes rotation of the seat coupling gear thereby adjusting the tilt of the seat coupling about the tilt axis;
- a tilt controller remote from and communicative with the seat adjustment mechanism and operable by a rider of a bicycle to actuate the tilt actuator thereby adjusting the tilt of the seat coupling relative to the seat tube coupling; and
- a control unit communicative with the tilt inertial sensor and the tilt controller and configured, in response to a signal received from the tilt controller, to operate the seat adjustment mechanism by causing the prime mover to move and thereby cause rotation of the seat coupling gear and thereby adjust, about the tilt axis, the tilt of the seat coupling relative to the seat tube coupling.

17. The device of claim 16, wherein the seat adjustment mechanism further comprises a bevel gear mechanism to which is affixed the tilt inertial sensor.

18. The device of claim 17, wherein the seat coupling gear comprises a pair of satellite bevel gears assemblies coupled to the bevel gear mechanism.

19. The device of claim 18, wherein the seat adjustment mechanism further comprises a dog bone linkage system coupling an output of the at least one motor to the pair of satellite bevel gears assemblies.

20. The device of claim 19, wherein the dog bone linkage system comprises a lower linkage module rotatably coupled to an upper linkage module.

21. A device for adjusting a seat position of a bicycle seat, the device comprising:
- a seat tube coupling configured to couple to a bicycle seat tube;
- a seat coupling configured to couple to a bicycle seat;
- a seat adjustment mechanism operable to permit adjustment, about a tilt axis, of a tilt of the seat coupling relative to the seat tube coupling, wherein the seat adjustment mechanism comprises a seat coupling gear fixed to the seat coupling, and wherein the seat adjustment mechanism further comprises a prime mover movably coupled to the seat coupling gear such that movement of the prime mover allows rotation of the seat coupling gear thereby adjusting the tilt of the seat coupling about the tilt axis; and
- a tilt controller mechanically communicative with the prime mover and operable by a rider of a bicycle, when the bicycle is in motion, to move the prime mover relative to the seat coupling gear and thereby allow adjustment of the tilt of the seat coupling relative to the seat tube coupling by allowing rotation of the seat coupling gear.

22. The device of claim 21, wherein the tilt controller is a lever.

* * * * *